US008510659B2

(12) United States Patent
Lam et al.

(10) Patent No.: US 8,510,659 B2
(45) Date of Patent: Aug. 13, 2013

(54) ANALYTICAL PREVIEWING OF MULTI-DIMENSIONAL SALES TERRITORY PROPOSALS

(75) Inventors: Yu Cong Lam, San Jose, CA (US); George Colliat, Emerald Hills, CA (US); Shih-Hsin Peng, Sunnyvale, CA (US); Francis Chang, San Mateo, CA (US); Teodoro Pimentel, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 364 days.

(21) Appl. No.: 12/857,410

(22) Filed: Aug. 16, 2010

(65) Prior Publication Data

US 2011/0041089 A1 Feb. 17, 2011

Related U.S. Application Data

(60) Provisional application No. 61/372,509, filed on Aug. 11, 2010, provisional application No. 61/234,242, filed on Aug. 14, 2009.

(51) Int. Cl.
*G06F 3/00* (2006.01)

(52) U.S. Cl.
USPC ........... 715/734; 715/736; 715/747; 715/765; 715/782

(58) Field of Classification Search
USPC .................... 715/734, 736, 747, 765, 782
See application file for complete search history.

(56) References Cited

U.S. PATENT DOCUMENTS

| | | | |
|---|---|---|---|
| 6,609,123 B1 | 8/2003 | Cazemier et al. | |
| 7,133,876 B2 | 11/2006 | Roussopoulos et al. | |
| 2002/0029207 A1* | 3/2002 | Bakalash et al. | 707/1 |
| 2002/0077998 A1 | 6/2002 | Andrews et al. | |
| 2002/0087516 A1 | 7/2002 | Cras et al. | |
| 2004/0158481 A1 | 8/2004 | Gennaro et al. | |
| 2004/0210468 A1 | 10/2004 | Rubel et al. | |
| 2007/0179831 A1 | 8/2007 | Patnaik et al. | |
| 2008/0104134 A1* | 5/2008 | Chellappa et al. | 707/201 |
| 2008/0294996 A1 | 11/2008 | Hunt et al. | |
| 2011/0040697 A1 | 2/2011 | Constantinou et al. | |
| 2011/0040698 A1 | 2/2011 | Chang et al. | |
| 2011/0125668 A1 | 5/2011 | Colliat et al. | |

OTHER PUBLICATIONS

ProAlign, ProAlign Sales Territory Alignment & Optimization Software, http://www.mappinganalytics.com/sales-territory-design/ProAlign.html, Copyright 2007, 3 pages.

(Continued)

*Primary Examiner* — William Bashore
*Assistant Examiner* — Mylinh Tran
(74) *Attorney, Agent, or Firm* — Kilpatrick Townsend & Stockton LLP

(57) ABSTRACT

Embodiments of the invention provide systems and methods for using multi-dimensional modeling techniques to handle analytical metrics and assignment previews, for example, in the context of territory proposals and what-if analysis. In some embodiments, a set of proposed territory definitions is generated in a territory management system to represent a hierarchical set of proposed territories each as a set of cells of a hypercube. A modification is received to the proposed territory definitions, and the proposed territory definitions are updated according to the modification. A query is received (e.g., at the territory management system via a user interface) and is executed against the proposed territory definitions in the territory management system to generate a query result. The query result is output to provide analytical metrics and/or assignment preview functionality.

14 Claims, 23 Drawing Sheets

(56) References Cited

OTHER PUBLICATIONS

ProAlign, ProAlign Features, http://www.mappinganalytics.com/pdf/ProAlign-features-website.pdf, Copyright 2007, 3 pages.

SymVolli, Territory Management, http://www.symvolli.com/symvolli/territory_management.aspx, Copyright 2008, 2 pages.

SalesTerritory.com, Web Applications for Sales Territory Management, http://www.salesterritory.com/web-applications.aspx, Copyright 2009, 5 pages.

Varicent, Functionality—Varicent Territory Management, http://www.varicent.com/territory_management.php, Copyright 2009, 1 page.

Veon Consulting, Veon Releases Territory Management for SugarCRM, http://veon.in/sugarcrm-consulting/index2.php?opton=com_content&do_pdf=1&id=60, accessed Aug. 4, 2009, 1 page.

U.S. Appl. No. 12/857,507, filed Aug. 18, 2010, Office Action mailed Jun. 29, 2012, 19 pages.

U.S. Appl. No. 12/857,407, filed Aug. 16, 2010, Office Action mailed Jun. 2, 2012, 18 pages.

U.S. Appl. No. 12/857,507, filed Aug. 16, 2010, Final Office Action mailed Nov. 19, 2012, 20 pages.

U.S. Appl. No. 12/857,507, filed Aug. 16, 2010, Advisory Action mailed Feb. 5, 2013, 4 pages.

U.S. Appl. No. 12/857,407, filed Aug. 16, 2010, Final Office Action mailed Dec. 11, 2012, 35 pages.

U.S. Appl. No. 12/857,407, filed Aug. 16, 2010, Advisory Action mailed Mar. 1, 2013, 4 pages.

\* cited by examiner

| Territory 1105 | Geo Low | Geo High | Geo SeqL | Geo SeqH | Prod Low | Prod High | Prod SeqL | Prod SeqH |
|---|---|---|---|---|---|---|---|---|
| California Sales 1010 | CA | | 1 | 9 | CRM | FIN | 1 | 5 |
| San Francisco Sales Division 1014 | San Fran | | 4 | 6 | CRM | | 1 | 3 |
| | San Fran | | 4 | 6 | ERP | | 4 | 4 |
| | San Mateo | | 1 | 3 | CRM | | 1 | 3 |
| | San Mateo | | 1 | 3 | ERP | | 4 | 4 |
| Sacramento Sales Division 1018 | Sacremento | | 7 | 9 | CRM | FIN | 1 | 5 |
| | San Mateo | | 1 | 3 | CRM | FIN | 1 | 5 |

| ABC R&D CALIFORNIA - TECH | Geography | Product | Account | Acct Type |
|---|---|---|---|---|
| | CA | Technology | ABC R&D | Named |

FIG. 24A

| TECHNOLOGY - WEST | Geography | Product | Account | Acct Type |
|---|---|---|---|---|
| | West | Technology | All | Not Named |

FIG. 24B

| BI APPS OVERLAY - WEST | Geography | Product | Account | Acct Type |
|---|---|---|---|---|
| | West | BI Apps | All | All |

ANALYTICAL PREVIEWING OF MULTI-DIMENSIONAL SALES TERRITORY PROPOSALS

CROSS-REFERENCES

This application claims priority from co-pending U.S. Provisional Patent Application No. 61/234,242, filed Aug. 14, 2009, entitled "MULTIDIMENSIONAL MANAGEMENT OF SALES TERRITORY"; and from co-pending U.S. Provisional Patent Application No. 61/372,509, filed Aug. 11, 2010, entitled "MULTIDIMENSIONAL MANAGEMENT OF SALES TERRITORY"; both of which are hereby incorporated by reference, as if set forth in full in this document, for all purposes.

BACKGROUND

Embodiments of the present invention relate generally to multi-dimensional modeling, and, more particularly, to sandboxing and what-if analysis in the context of multi-dimensional jurisdictional territories.

Many types of commerce involve sales territories for selling products or services. Sales territories may define jurisdictions of responsibility of sales representatives over sales accounts, and may effectively form a foundational infrastructure for sales management. Typically, the sales territories may be created and managed in such a way as to optimize certain sales metrics, like return on sales investment. Territory design optimizations often involve balancing trade-offs between large numbers of factors, which may be independent, interrelated, hierarchical, ordered, etc.

Many typical techniques for defining and managing sales territories use a rule-based algorithm to define a territory, and apply the rule-based algorithm to sales account attributes and opportunities to determine in which territory each belongs. Using rule-based algorithms in this way can be undesirable for a number of reasons. Over time, the many levels of interdependent rules in a typical sequential algorithm for defining territories can become difficult to comprehend, inefficient to apply, and difficult (and possibly dangerous) to test and/or change.

For example, the rules may be sequentially executed as a program algorithm whenever an account or opportunity is assigned. When the number of rules becomes large and/or the relation between the rules becomes complex, it may take very experienced information technology professionals to thoroughly understand, use, and manipulate the rules. Moreover, even those experienced professionals may find it difficult or impossible to conclusively and efficiently determine whether the rules are correct (e.g., whether defined territories have gaps, overlap, exceed the jurisdiction of their higher level sales hierarchy, etc.).

Even further, while experienced information technology professionals may have the skill sets to define and maintain territories, they may not have practical experience using the territories for actual sales management. Rather, it may be desirable for the end business users to communicate and define territories for their sales representatives. Potential disconnects between these parties may cause rule-defined territories to be suboptimal from the perspective of the parties affected by the territory definitions.

For at least these reasons, rule-based territory definition and management may result in suboptimal territory definitions, unpredictable results from territory changes and opportunity assignments, inconclusive rule verifications, and/or other undesirable effects.

BRIEF SUMMARY

Among other things, systems and methods are described for using multi-dimensional modeling techniques to handle analytical previews relating to territory proposals for territory changes, for performing what-if analyses, etc. The analytical previews allow for generating analytical metrics, trend analyses, opportunity assignment previews, etc. Embodiments use multi-dimensional modeling to define territories in such a way that accounts for applicable territory criteria as sets with logical boundaries, rather than as a defined rule-based architecture. For example, territory criteria are modeled as hierarchical dimensions of a territory hypercube.

In one set of embodiments, a method is provided. The method includes generating a set of proposed territory definitions in a territory management system, the set of proposed territory definitions representing a hierarchical set of proposed territories each as a set of cells of a hypercube, the hypercube defined according to a set of territory dimensions each having a set of dimension members, such that each cell represents an intersection of dimension members from each territory dimension, and at least some of the cells store metrics data corresponding to its intersection of the dimension members from each territory dimension; receiving a modification to the proposed territory definitions at the territory management system via a user interface; updating the proposed territory definitions in the territory management system according to the modification; receiving a query at the territory management system via a user interface; executing the query against the proposed territory definitions in the territory management system to generate a query result; and outputting the query result from the territory management system via the user interface.

In another set of embodiments, a system is provided. The system includes a user interface subsystem, configured to: receive a modification to a set of proposed territory definitions at a territory management system, the set of proposed territory definitions representing a hierarchical set of proposed territories each as a set of cells of a hypercube, the hypercube defined according to a set of territory dimensions each having a set of dimension members, such that each cell represents an intersection of dimension members from each territory dimension, and at least some of the cells store metrics data corresponding to its intersection of the dimension members from each territory dimension; and receive a query. The system also includes an analysis subsystem, communicatively coupled with the user interface subsystem, and configured to: update the proposed territory definitions according to the modification; execute the query against the proposed territory definitions to generate a query result; and output the query result via the user interface subsystem.

In yet another set of embodiments, a machine-readable medium is provided having stored thereon a series of instructions which, when executed by a processor in a territory management system, cause the processor to perform steps. The steps include: generating a set of proposed territory definitions in a territory management system, the set of proposed territory definitions representing a hierarchical set of proposed territories each as a set of cells of a hypercube, the hypercube defined according to a set of territory dimensions each having a set of dimension members, such that each cell represents an intersection of dimension members from each territory dimension, and at least some of the cells store metrics data corresponding to its intersection of the dimension members from each territory dimension; receiving a modification to the proposed territory definitions at the territory management system via a user interface; updating the proposed territory definitions in the territory management system according to the modification; receiving a query at the territory management system via a user interface; executing the query against the proposed territory definitions in the territory management system to generate a query result; and outputting the query result from the territory management system via the user interface.

BRIEF DESCRIPTION OF THE DRAWINGS

FIGS. 24A-24C illustrate examples of specific features of territory definition relating to named sales accounts.

DETAILED DESCRIPTION

Figure 1:
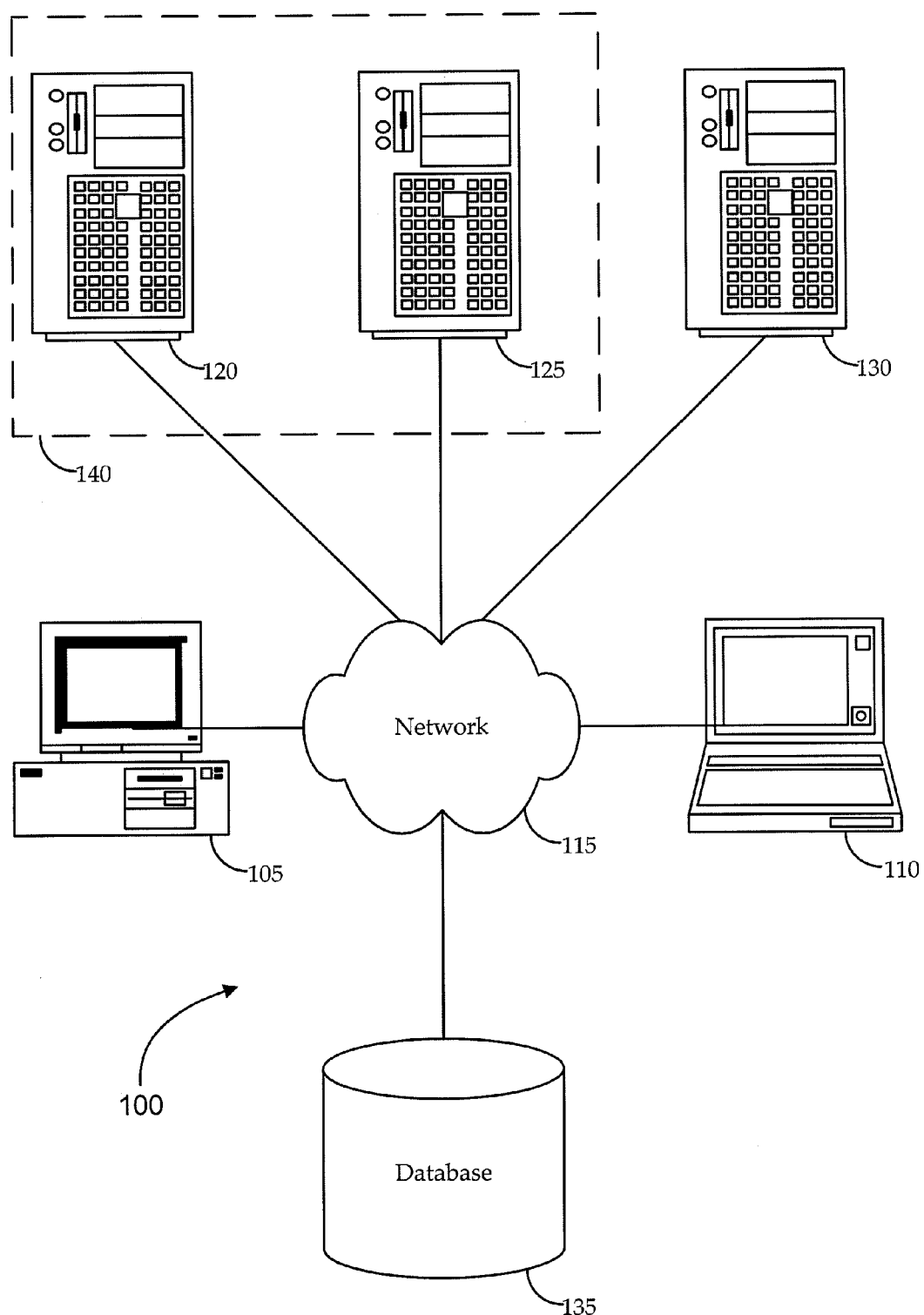
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to non-transitory portable or fixed storage devices, optical storage devices, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Some embodiments are described herein for using multi-dimensional modeling techniques to optimize definition and management of sales territories. Embodiments use multi-dimensional modeling to define territories in such a way that accounts for applicable territory criteria as sets with logical boundaries, rather than as a defined rule-based architecture. For example, territory criteria are modeled as hierarchical dimensions that form boundaries to a territory hypercube. An individual territory may be a set of cells in the hypercube. In certain embodiments, the territory (e.g., set of cells) is formalized by an Multi-Dimensional Expressions (MDX) query.

Embodiments of multi-dimensional territory definition and management may substantially avoid many of the undesirable aspects of complex, order-dependent rules used to define and manage territories in many typical architectures. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems).

These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 120, 125, 130. Alternatively, it may be remote from any or all of the computers 105, 110, 120, 125, 130, and/or in communication (e.g., via the network 115) with one or more of these. In a particular set of embodiments, the database 135 may reside in a storage-area network (SAN) familiar to those skilled in the art. Similarly, any necessary files for performing the functions attributed to the computers 105, 110, 120, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
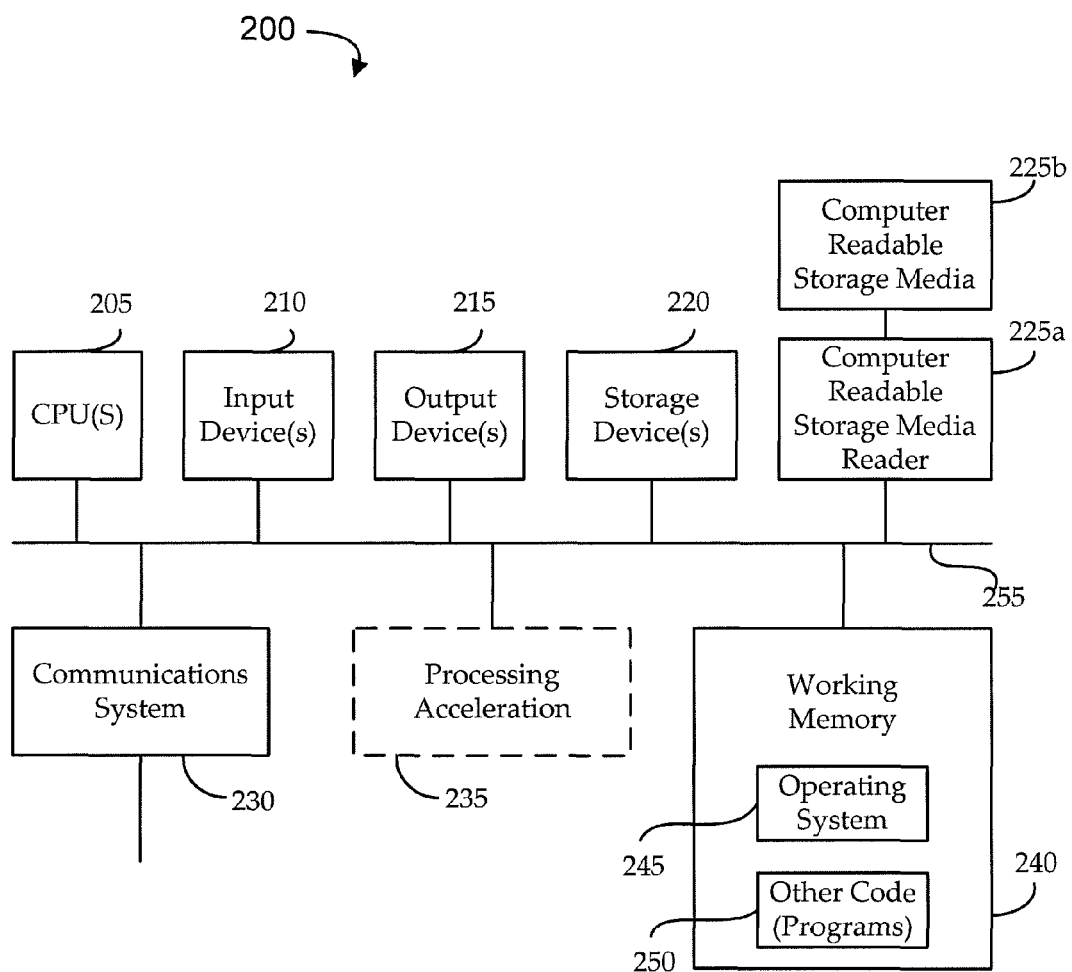
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device(s) 220. By way of example, storage device(s) 220 may be disk drives, optical storage devices, a solid-state storage device such as a random access memory (RAM) and/or a read-only memory (ROM), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 115 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
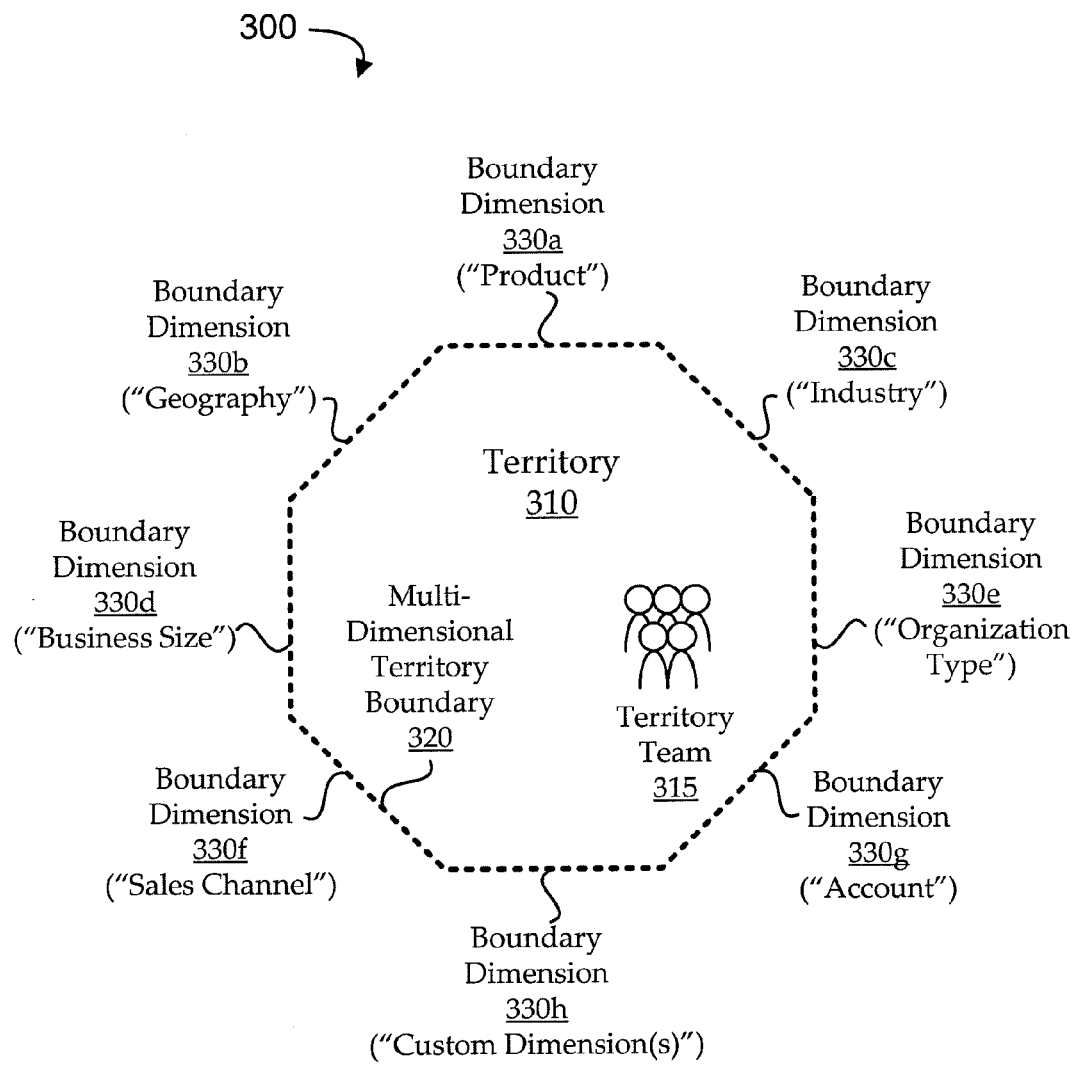
FIG. 3 shows a representative diagram of an illustrative multi-dimensional territory, according to various embodiments.

FIG. 3 shows a representative diagram 300 of an illustrative multi-dimensional territory 310, according to various embodiments. The description herein focuses on sales territories 310, which broadly include jurisdictions of responsibility of sales representatives over sales accounts. It will be appreciated, however, that the illustrative territory 310 may be any kind of territory 310 defined by any type of boundary without departing from the scope of the invention. For example, the territory 310 may relate to jurisdictions for providing goods and/or services, indirect sales channels, and/or other types of jurisdictions that may be divided into hierarchical sub jurisdictions having certain corresponding boundaries and/or responsibilities.

Each jurisdiction may represent a right, privilege, etc. to perform a certain function within certain boundaries, as defined by the territory 310, and different types of jurisdictions can be expressed as different territory types. For example, as described above, a "sales" territory 310 may have jurisdictions representing a right (e.g., with respect to business objectives, legal obligations or restrictions, corporate policies, marketplace features, etc.) to sell goods and/or services to a certain group of customers within the territory 310. Other types of territories 310 may represent jurisdictions for supporting customers, managing customers, managing opportunities (e.g., sales leads), legal functions, etc. For example, an in-house attorney may have jurisdiction over procurement contract matters that arise for a certain product family in a certain geographic region.

Sales management infrastructures may typically be built on a foundation of sales territories 310. For example, the territory 310 of FIG. 3 is a sales territory 310 having a multi-dimensional territory boundary 320 defined by a set of territory dimensions 330. A territory team 315 (e.g., a set of sales resources) is assigned to the territory. Typically, the territory 310 may be created and managed in such a way as to optimize certain sales metrics, like return on sales investment. These territory design optimizations may involve balancing trade-offs between large numbers of factors, which may be independent, interrelated, hierarchical, ordered, etc. Many such factors are discussed below with reference to territory 310 alignments, analytics, metrics, etc. For example, some sales organizations may try to configure territories to create substantially equal sales opportunities.

The factors may be balanced according to corresponding territory dimensions 330. One territory dimension 330a may relate to product family, for example, whereby sales representatives are dedicated to selling only products and applications belonging to a certain subset, or family, of the total product line (e.g., where they have special knowledge). Another territory dimension 330b may relate to geographical area, for example, whereby regions (e.g., the world) are subdivided into geographical zones. Yet another territory dimension 330c may relate to vertical industry, for example, whereby sales representatives are dedicated to groups of similar customers where they understand the special buying needs of the industry. Still another territory dimension 330d may relate to account or business size, for example, whereby a more expensive sales force is dedicated to bigger customers, and a lower cost sales force is dedicated to smaller customers.

Another territory dimension 330e may relate to organization type, whereby certain sales resources and/or processes are applied to certain types of organizations. For example, sales resources may be dedicated to different processes required by government interests and their respective federal, state, and/or local governments. Still another territory dimension 330f may relate to sales channels, for example, whereby sales representatives are dedicated to direct sales, telesales, resellers, value-added resellers (VARs), and/or other channels of commerce. Yet another territory dimension 330g may relate to account status. For example, some sales resources may be dedicated to specific named accounts that have a special strategic importance.

Some other territory dimensions 330h may relate to custom dimensions. The custom dimensions allow an administrator to define additional or alternate territory dimensions 330 that are specific for the customer's business. For example, an administrator may define certain types of product families, geographic boundaries, etc. to align with particular business goals.

These and/or other territory dimensions 330 may make up the multi-dimensional, hierarchical, logical territory boundary 320 for the sales territory 310. It will be appreciated that, while the territory dimensions 330 of the representative diagram 300 are shown as sides of a two-dimensional polygon (e.g., a flat octagon), each territory dimension 330 is intended to be a dimension of the territory 310 definition. For example, the territory dimensions 330 may be dimensions of a multi-dimensional territory 310 hypercube, where the territory 310 is a set of cells of the hypercube.

Figure 4:
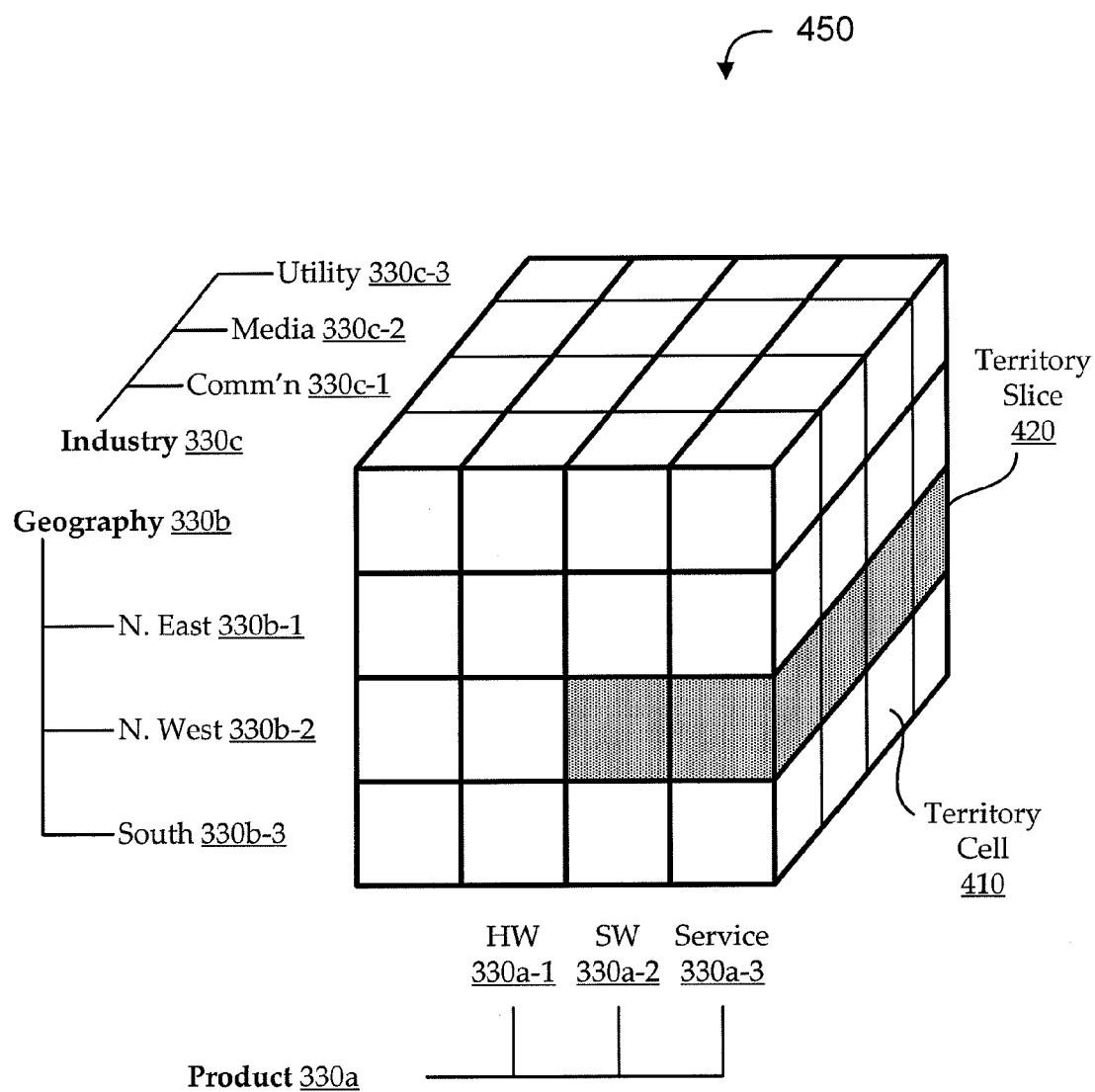
FIG. 4 shows a representative diagram of a territory hypercube, according to various embodiments.

FIG. 4 shows a representative diagram of a territory hypercube 450, according to various embodiments. For the sake of clarity, the territory hypercube 450 is shown with only three territory dimensions 330 (e.g., as a cube). Also for the sake of clarity, each territory dimension 330 is shown as having three members. For example, the Product territory dimension 330a is shown as having members of hardware ("HW"), software ("SW"), and "Service." Of course, the territory hypercube 450 may be defined by any number of territory dimensions 330, and each territory dimension 330 may include any number of members.

In the embodiment shown, three orthogonal territory dimensions 330 form the territory hypercube 450: "Product," "Geography," and "Industry." As described above, the Product territory dimension 330a is shown as having members of "HW" 330a-1 (hardware), "SW" 330a-2 (software), and "Service" 330a-3 The Geography territory dimension 330b is shown as having members of "N. East" 330b-1, "N. West" 330b-2, and "South" 330b-3. The Industry territory dimension 330c is shown as having members of "Comm'n" 330c-1 (communications), "Media" 330c-2, and "Utility" 330c-3.

The intersection of three members of different territory dimensions 330, such as ("SW" 330a-2, "N. West" 330b-2, "Media" 330c-2) form a territory cell 410 in the territory hypercube 450 (e.g., a tuple). Typically, a territory 310 is defined as a set of territory cells 410. Accordingly, a hypercube such as hypercube 450 depicted in FIG. 4 may include one or multiple territories 310. In one embodiment, the entire territory may correspond to a single territory cell 410. In other embodiments, a territory 310 may be represented by multiple cells of hypercube 450. A territory cell 410 may be considered a "micro-territory," and represents the smallest grain of territory that can be managed.

In another embodiment, the territory 310 is defined by a territory slice 420. The territory slice 420 may include any set of cells that includes only one member in at least one territory dimension 330. For example, as illustrated, a sales representative may be assigned to sell software and services products across all industries, but only for the Northwest region. The corresponding territory 310 may be defined in a number of ways, including as {("N. West", "SW"), ("N. West", "Service")}; as {["SW", "Service"], ["N. West"], ["Unspecified"]}; etc. The illustrative territory 310 is shown as the territory slice 420 in FIG. 4.

In still other embodiments, territories 310 include other shapes and/or sizes of sets of territory cells 410. Certain embodiments of territories 310 include multiple territory slices 420 and or territory cells 410. For example, a sales representative may be assigned to the territory defined by the territory slice 420 described above plus communications hardware in the Northeast region. In another example, the sales representative is assigned to a set of non-adjacent cells.

While the above description refers to territories as being "defined" as one or more cells of the hypercube 450, the actual territory definition may typically be maintained and manipulated outside the hypercube 450. According to some embodiments, the territory hypercube 450 is defined within an Online Analytical Processing (OLAP) business intelligence framework. Of course, other embodiments may use other types of frameworks, such as Online Transaction Processing (OLTP), Essbase, HOLAP, WOLAP, etc.

For example, the hypercube 450 defines a set of territory dimensions 330. The overall extents of the hypercube 450 (e.g., the full range of all territory dimensions 330 of the hypercube 450) defines the entire marketplace, which may be considered as a top-level territory 310. Each territory 310 is a set of cells 410 in the hypercube 450. In some embodiments, the set of cells 410 associated with each territory 310 is maintained in OLTP according to a Multi-Dimensional Expressions (MDX) representation, or in any other useful way.

As described more fully below, a definition of a territory 310 as its corresponding cells of the hypercube 450 is referred to herein as a "normalized" definition of the territory 310. This normalized definition may be "de-normalized" in one or more ways, such that de-normalized definition is an efficiently queriable list of territory dimension member ranges and/or other useful territory information. For example, the de-normalized territory definition is the results of a dot-product of the territory dimensions 330 for the normalized territory definition. An example of a de-normalized territory definition is described below with reference to FIG. 11. It will be appreciated that the normalized and de-normalized territory definitions, as facilitated by frameworks, such as OLAP, OLTP, and MDX, may facilitate execution of complex, ad-hoc queries over a multi-dimensional data model, like the territory hypercube 450.

For example, some embodiments of the territory hypercube 450 are implemented as an OLAP cube. The OLAP cube (e.g., or hypercube, where n-dimensional) implementation may provide certain features. One feature may include allowing analysis of data through "pivoting." Pivoting may effectively rotate the territory hypercube 450 to provide an alternative presentation of the data (e.g., to change the dimensional orientation of the data for reporting). For example, data may be analyzed with respect to a first territory dimension 330 and then efficiently (e.g., relatively rapidly) reoriented to be analyzed with respect to a second territory dimension 330. While this type of operation may be highly inefficient and time-consuming using a traditional rule-based architecture (e.g., re-summarizing large amounts of data in many dimensions in those frameworks may be relatively processor intensive), pivoting even highly dimensional data within a hypercube framework may be relatively rapid and efficient.

In addition to pivoting and other reorientation features, hypercube architectures may facilitate other operational functionality. For example, as described above, a subset of the territory hypercube 450 can be analyzed as a territory slice 420. Similarly, multiple (e.g., consecutive) territory slices 420 may be analyzed using a "dicing" operation. Further, as described more fully below, certain hierarchical functionality may be available. For example, a business user may navigate through a hierarchy by "drilling up" or "drilling down" through hierarchical levels of members of the territory dimensions 330, and/or by "rolling up" relationships for territory dimensions 330 (e.g., according to defined formulae).

Notably, territory definitions may include a hierarchical set of territories 310, each defined within a framework of multiple territory dimensions 330. Further, each territory dimension may include a hierarchical set of dimension members. For example, each territory 310 or each territory dimension member may have a parent (e.g., except at a top hierarchy level), and each may represent an aggregation of its children (e.g., except at a bottom hierarchy level).

Figure 5:
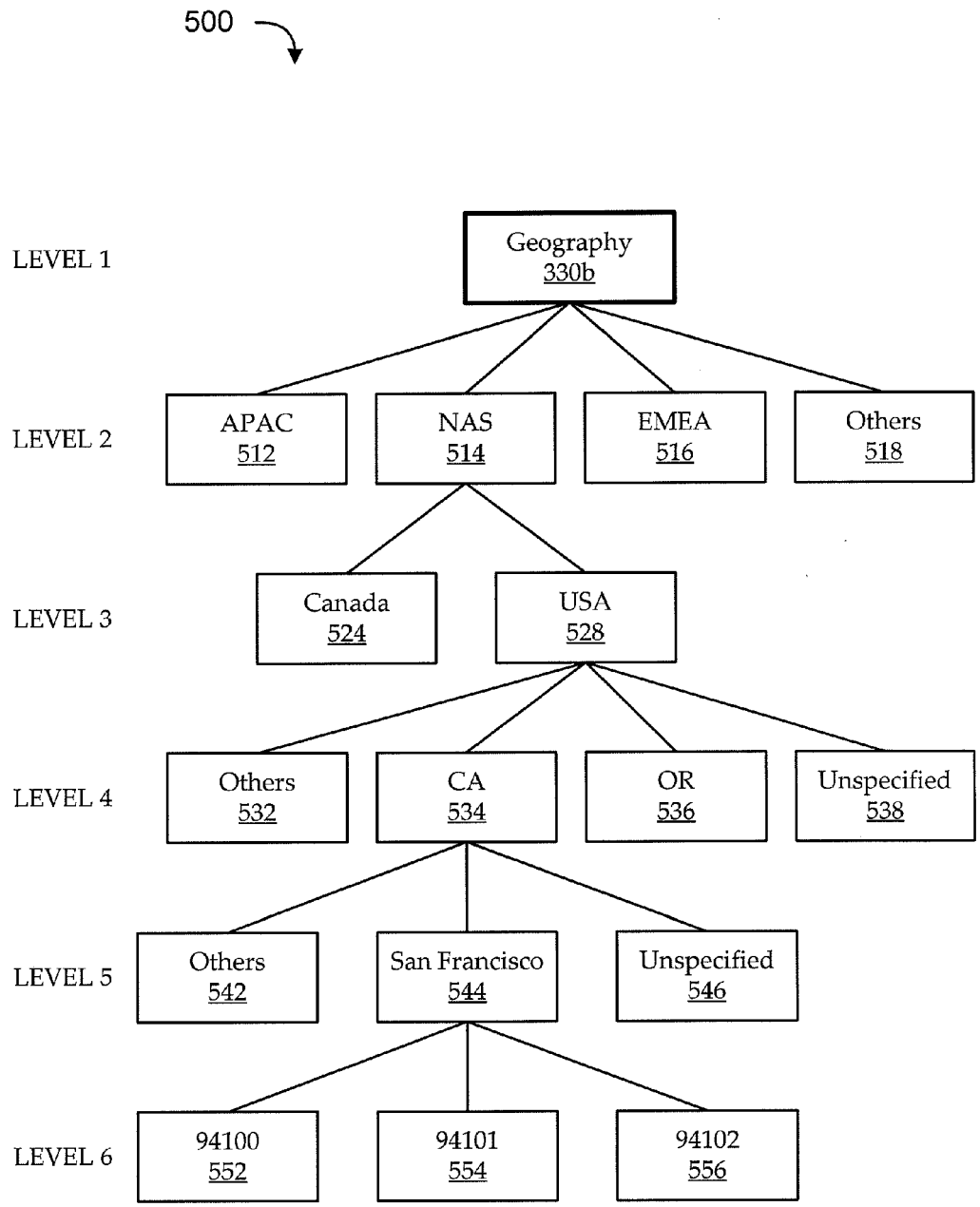
FIG. 5 shows an illustrative hierarchy diagram of members of an embodiment of a "Geography" territory dimension.

FIG. 5 shows an illustrative dimension member hierarchy diagram 500 of members of an embodiment of a "Geography" territory dimension 330 (e.g., the geography territory dimension 330b of FIGS. 3 and 4). At a first level of the hierarchy diagram 500, the geography territory dimension 330b includes broad geographic region members. For example, the first hierarchical level may include "APAC" 512 (representing an Asia-Pacific region), "NAS" 514 (representing a North American Sales region), "EMEA" 516 (representing a Europe, Middle East, and Africa region), and "Others" 518 (representing all other geographic regions falling outside the APAC 512, NAS 514, and EMEA 516 regions).

According to one embodiment, the NAS 514 region is divided into "Canada" 524 and "USA" 528 sub-regions. Notably, the members of this second level of the hierarchy diagram 500 are children of members of the first level of the hierarchy diagram 500, and are also members of the geography territory dimension 330b. Similarly, members of the first level of the hierarchy diagram 500 are parents of members of this second level of the hierarchy diagram 500 (e.g., in this particular illustrated embodiment, only one first-level member has children). In some embodiments, an additional level may be included at the top of the hierarchy diagram 500, for example, as a "World" or "All" member to denote the set of all members of the entire geography territory dimension 330b. The levels and the parent-child relationships between may be user configurable.

At a third level of the hierarchy diagram 500, the USA 528 sub-region is split into "Others" 532, "CA" 534 (California), "OR" 536 (Oregon), and "Unspecified" 538. The CA 534 member may have children, including "Others" 542, "San Francisco" 544, and "Unspecified" 546. The San Francisco 544 member may further have children, including "94100" 552, "94101" 554, and "94102" 556 (e.g., individual zip codes in the San Francisco region).

It is worth noting that the hierarchy diagram 500 is intended only to show one illustrative embodiment, and should not be construed as limiting the scope of the invention. Many other hierarchy diagrams 500 are possible, including any number of levels, each having any number of members, each having any number of children. Further, different architectures of hierarchy diagrams 500 may provide certain functionality through members, such as "Others," "Unspecified," or similar.

As described above, an "Others" member at a hierarchy level may include all potential children of a common parent member other than the ones defined by other specified members at that hierarchy level. For example, there may be large markets for a product in California (e.g., CA 534 region) and Oregon (OR 536 region), and small markets everywhere else. As such, it may be desirable to assign territories 310 specifically for California and Oregon, but to assign all opportunities outside those regions to a generic "Others" region (e.g., Others 532 region).

In some other cases, geography of an opportunity may be unknown. For example, a sales opportunity may arise for a certain type of product through a certain sales channel for a certain industry in the United States, but the particular region within the United States is not specified as part of the opportunity. According to one embodiment, the USA 528 region may be used for assigning the opportunity to a territory 310, as the USA 528 region includes all its child regions. According to other embodiments, an "Unspecified" region (e.g., Unspecified 538 region) is provided as a child of the USA 528 region and used for assigning the opportunity.

Notably, some territories 310 are so similar as to be almost clones, with only minor differences. For example, a USA co-prime territory is identical to a USA prime territory, except that the prime territory covers all products, and the co-prime territory covers only technology products. Embodiments provide functionality for handling inherited territories. Inherited territories facilitate the definition and maintenance of those near clones; they inherit the definition of one or more source territories. The source and inherited territories may be at different hierarchy levels, and some dimensions may be excluded from inheritance. When the dimension of a source territory is modified, the updates are propagated to all the territories 310 that inherit that dimension from the source.

In some embodiments, certain territory functionality is adapted for use with so-called "named" sales accounts. Some sales organizations treat some strategic customers in a special way as named sales accounts by assigning specific sales resources to them. Sometimes some sales accounts for a given customer are considered strategic whereas others are not; sometimes sales accounts that are strategic for one territory may not be strategic for others. To account for all possibilities, named sales accounts may be represented explicitly in a territory dimension 330, such as the account dimension, and their parent in the account dimension must also appear explicitly (i.e., their parent is also a named sales account). For example, the account dimension includes all the named sales accounts as explicit members, as well as the [Others] and [Unspecified] members throughout the hierarchy. All unnamed sales accounts (e.g., implicit accounts) may be covered by [Others].

Some named sales accounts may have special treatment for some territories 310 (e.g., license sales), but normal treatment for others (e.g., training sales). In some embodiments, an "Account Type" dimension is used to indicate if a named sales account has a special named sales account treatment for a given territory 310. For example, the tables shown in FIGS. 24A-24C illustrate examples of specific features of territory definition.

Turning first to FIG. 24A, all the ABC R&D sales accounts in California that are named sales accounts, and all opportunity revenue and leads for technology products for those accounts are part of the "ABC R&D California—Tech" territory 310. This would include any ABC R&D named (explicit) accounts, but would not include ABC R&D unnamed (implicit) accounts. As shown in FIG. 24B, unnamed sales accounts may be used for specific products. For example, all the unnamed sales accounts in the West region and all opportunity revenue and leads for Technology products for those accounts are assigned to the "Technology—West" territory 310. Looking at FIGS. 24A and 24B together, and assuming that "California" is part of the "West" region, all the non-named accounts of ABC R&D in California may be assigned to the "Technology—West" territory 310 according to FIG. 24B. As shown in FIG. 24C, all accounts may be for specific products. All the sales accounts in the West region and all opportunity revenue and leads for BI Apps products for those accounts are assigned to the "BI Apps Overlay—West" territory 310.

As described above, some embodiments of territories 310 are described in the context of a territory hypercube 450 having certain territory dimensions 330. For the sake of illustration, the territory hypercube 450 may be an OLAP hypercube defined and analyzed using a Multi-Dimensional Expressions (MDX) language. The members of a dimension hierarchy may be either explicitly or implicitly defined. For example, in the illustrative hierarchy diagram 500 of FIG. 5, California and Oregon are explicitly defined as state members [CA] 534 and [OR] 536, while other states may be considered as implicitly defined under the "Other" 532 member.

According to the geography territory dimension 330b hierarchy diagram 500 of FIG. 5, [USA] stands for the member of the hierarchy diagram 500 indicating the USA 528 region, and includes the set of all members in the USA sub-hierarchy, whether they appear explicitly or implicitly in the hierarchy.

Only two state members, [CA] and [OR], appear explicitly under [USA]; all other states (AZ, NV . . . ) may be considered as implicit children of the [Others] member 532. In other words, the [USA].[Others] member may represent all sub-regions of the USA region, except [CA] (California) and [OR] (Oregon). Similarly, all children of [OR] are implicit, such that [OR] represents all of Oregon.

It may be desirable for explicit members to be selected as members likely to change infrequently and likely to be meaningful from a market subdivision point of view, as these characteristics may provide stability over time to the definition of related territories 310. Further, as described above, the [Unspecified] child may represent its parent and all of the parent's children. For example, the member [USA].[Unspecified] may represent anywhere in the USA.

It will now be appreciated that a territory dimension 330 of a territory hypercube 450 may include a set of members, and the set of members may be arranged according to a hierarchical topology. As discussed above, territories 310 may, themselves, be hierarchical (e.g., as a result of the hierarchies of their respective dimension members). For example, a territory 310 hierarchy level includes members from a first territory dimension 330, and those members may have children from one or more other territory dimensions 330.

Figure 6:
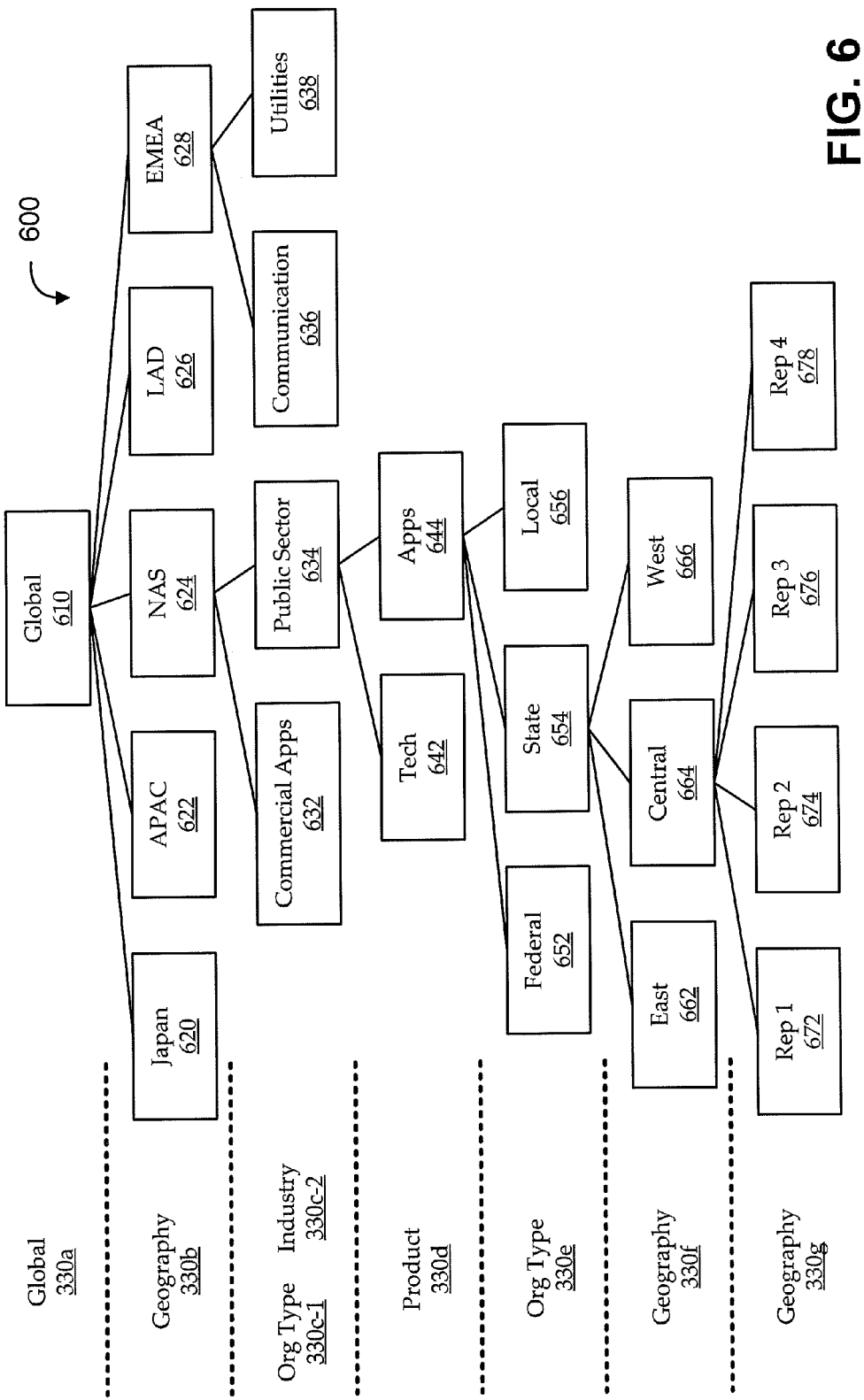
FIG. 6 shows an illustrative cross-dimensional hierarchy diagram for an embodiment of a territory.

FIG. 6 shows an illustrative territory hierarchy diagram 600 having multiple hierarchy levels. Each territory 310 is effectively a superset of all its children, which may represent a typical delegation of responsibility down a sales hierarchy. A child territory may represent a subset of its parent territory. Partitioning of jurisdictions at each level may be effectuated along various territory dimensions 330.

Following one chain of the hierarchy in the illustrative territory hierarchy diagram 600, a top level "Global" territory dimension 330*a* has a single member, "Global" 610, which is partitioned according to a "Geography" territory dimension 330*b*. One of the Geography territory dimension 330*b* members, "NAS" 624, is partitioned by an "Org Type" territory dimension 330*c*-1. One of the Org Type territory dimension 330*c*-1 members, "Public Sector" 634, is partitioned by a "Product" territory dimension 330*d*. One of the Product territory dimension 330*d* members, "Apps" 644, is partitioned by another "Org Type" territory dimension 330*e*. One of the other Org Type territory dimension 330*e* members, "State" 654, is partitioned by another "Geography" territory dimension 330*f*. One of the other geography territory dimension 330*f* members, "Central" 664, is partitioned by yet another "Geography" territory dimension 330*g*. The yet other geography territory dimension 330*g* is at the bottom of the hierarchy and includes members representing various sales representatives (e.g., belonging to the territory team 315 of FIG. 3).

Notably, as discussed above, the "NAS" 624 member of the highest-level Geography territory dimension 330*b* is partitioned by an "Org Type" territory dimension 330*c*-1. However, another member of that same "Geography" territory dimension 330*b* level, "EMEA" 628, is partitioned by an "Industry" territory dimension 330*c*-2. The illustrative hierarchy diagram 600 is intended only to show one possible hierarchy, and should not be construed as limiting the scope of the invention.

Accordingly, in some embodiments, defining territories 310 may involve filling a tree table by step-wise refinement of the definition of each parent territory 310. The top territory may have jurisdiction over all accounts and all opportunities. In terms of the multi-dimensional modeling, the top-level territory may include all the cells 410 in the hypercube and may thus have jurisdiction over all the territory cells 410 of the territory hypercube 450. For example, this top-level territory 310 may represent the entire market from the perspective of the hypercube 450 users. Each child territory 310 may then have jurisdiction over a subset of the territory cells 410 of its parent territory.

The child territory may be defined by refining the territory dimensions 330 of its parent territory. For example, the territory dimensions 330 may be refined using a dimension picker that only gives access to the territory dimension 330 members over which the parent territory has jurisdiction. This may help ensure that each child territory 310 is a subset of its parent territory. The child territories can be validated for territory dimension 330 member correctness, overlaps, gaps, etc. For example, there may be no need to define complex rules, or to be concerned with the order of execution of the rules, as territories 310 are defined as sets of territory cells 410 in the territory hypercube 450.

Embodiments of multi-dimensional territory 310 definition and management, including embodiments discussed above with reference to FIGS. 3-6, may be implemented using various types of systems. For example, computational systems according to certain embodiments are described with reference to FIGS. 1 and 2 above. Those computational systems and/or other types of systems may be used to implement various embodiments of the invention, described as functional blocks in FIGS. 7 and 8, below.

Figure 7:
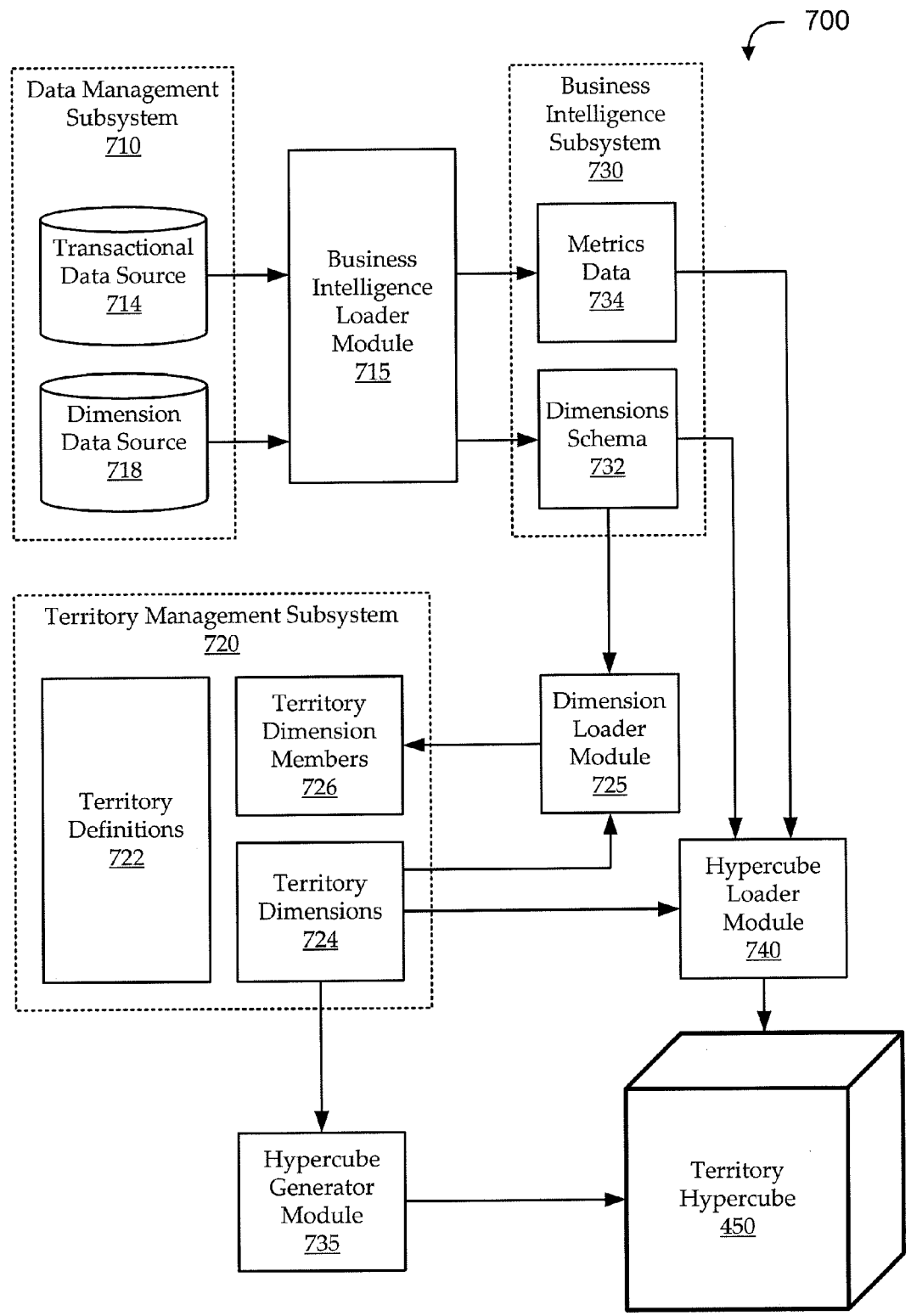
FIG. 7 shows a block diagram of a system for multidimensional modeling of territories, according to various embodiments.

Turning to FIG. 7, a block diagram is shown of a system 700 for multidimensional modeling of territories 310, according to various embodiments. The system 700 includes a number of subsystems, configured to interact via one or more modules to generate and affect a territory hypercube 450. For example, as shown, the system 700 includes a data management subsystem 710, a territory management subsystem 720, and a business intelligence subsystem 730.

Embodiments of the data management subsystem 710 include a transactional data source 714 and a dimension data source 718. Each of the transactional data source 714 and the dimension data source 718 may represent one or more internal or external data sources. For example, as sales transaction data is received from various sales territories 310, it may be handled by (e.g., stored, collated, processed, passed, etc.) the transactional data source 714. Similarly the dimension data source 718 may handle data being input to the system relating to territory dimensions 330, such as changes to territory dimension 330 members, hierarchies, etc.

The data from the data management subsystem 710 may be loaded (e.g., by a business intelligence loader module) to the business intelligence subsystem 730. In some embodiments, data from the dimension data source 718 may be used by the business intelligence subsystem 730 to generate and/or adjust dimensions schema 732. For example, the dimensions schema 732 may define the members of a territory dimension 330, relationships between members, etc.

In some embodiments, data from the transactional data source 714 is used by the business intelligence subsystem 730 to generate and/or adjust metrics data 734. The metrics data 734 may include any useful metrics that may be applied across one or more territories 310. For example, the metrics data 734 may be loaded to the territory hypercube 450 for analysis against one or more territory dimensions 330. In certain embodiments, as described above, the metrics loaded to the territory hypercube 450 are used to analyze and/or report metrics data 734.

Each cell of the hypercube 450 includes a set of metrics data 734 that applies to that cell. For example, a cell represents hardware products relating to communications for the Northeastern region (e.g., a cell 410 at the intersection of dimension members 330*a*-1, 330*b*-1, and 330*c*-1 of the hypercube 450 of FIG. 4). That cell contains metrics (e.g., total sales revenue, number of leads, etc.) for those products represented by that cell. Notably, metrics data 734 for a territory 310 may effectively be the aggregation of metrics data 734 contained in the set of cells 410 included in the territory definition.

Embodiments of the territory management subsystem 720 are configured to define and manage territories 310. In some embodiments, the territory management subsystem 720 includes a set of territory definitions 722 for defining territories 310 (e.g., as a set of territory cells 410 in a territory hypercube 450), sets of territory dimensions 724 (e.g., as a set of territory dimensions 330 associated with a territory hypercube 450), and sets of territory dimension members 726 (e.g., as sets of members corresponding to each of the territory dimensions 330 of the territory hypercube 450).

In some embodiments, dimensions schema 732 is loaded (e.g., by a dimension loader module 725) to the set of territory dimension members 726 to maintain the membership information according to new inputs received via the dimension data source 718 (e.g., via the data management subsystem 710 and the business intelligence subsystem 730). It may be desirable, in some embodiments, to communicate the sets of territory dimensions 724 to the dimension loader module 725 to maintain a proper correlation between changes to membership and an updated set of territory dimensions 330.

The various types of data described above may then be used to generate and affect the territory hypercube 450. In some embodiments, a hypercube generator module 735 uses data from the territory management subsystem 720 (e.g., the sets of territory dimensions 724) to generate the territory hypercube 450. For example, the sets of territory dimensions 724 may effectively define the size and dimensionality of the territory hypercube 450. A hypercube loader module 740 may then load data into the territory hypercube 450, according to the sets of territory dimensions 724 and their respective sets of territory dimension members 726. For example, the hypercube loader module 740 may load the territory hypercube 450 according to dimensions schema 732, metrics data 734, sets of territory dimensions 724, etc.

According to some embodiments, the territory management subsystem 720 operates in an OLTP, OLAP, or similar framework. For example, as described above, the territory management subsystem 720 may generate and affect the territory hypercube 450 as an OLAP cube. The territory management subsystem 720 may coordinate proposal sandboxes, periodic synchronization of territory tables, etc. For example, the territory management subsystem 720 may use MDX to generate sales reports, territory 310 gap and/or overlap analyses, opportunity assignments and/or reassignments, load balancing, etc. according to territory definitions 722 and/or data defined by and in the hypercube 450.

Figure 8:
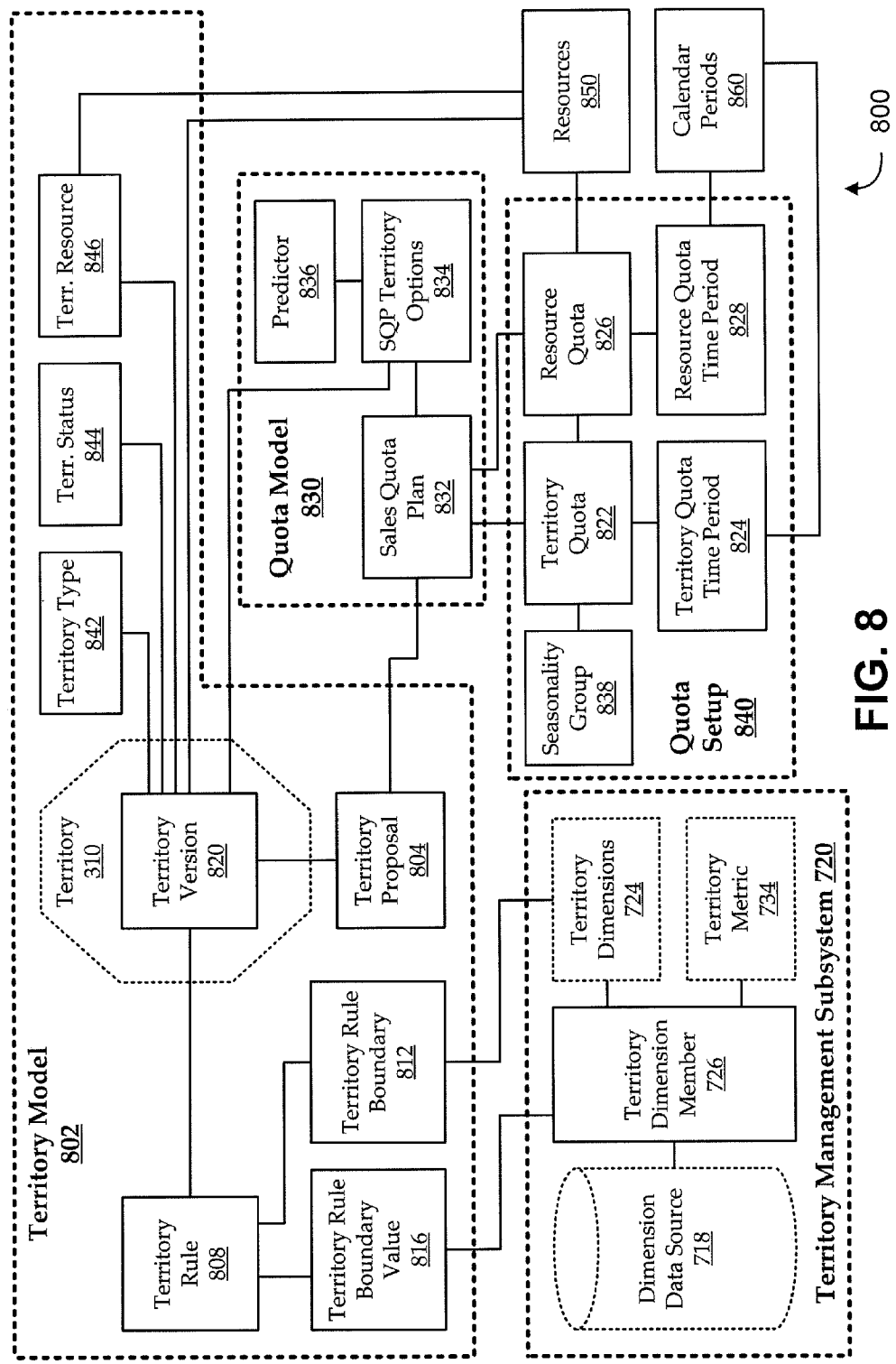
FIG. 8 shows a logical model by which embodiments of the territory management subsystem may operate, according to various embodiments.

FIG. 8 shows a logical model 800 by which embodiments of the territory management subsystem 720 may operate, according to various embodiments. Embodiments of modules, functional blocks, and/or other components of the logical model 800 may be implemented in hardware and/or software. For example, the logical model 800 may be implemented using software (e.g., code, instructions, etc.) executed using a processor and/or other hardware in a computational system (e.g., as described with reference to FIG. 2. Territory management relational tables may be maintained in a substantially real-time OLTP database using the illustrative logical model 800.

In some embodiments, the logical model 800 is built around the territory management subsystem 720. For example, the territory management subsystem 720 maintains relevant territory definitions, including territory dimension members 726. For the sake of context, some illustrative inputs to the territory dimension members 726 are shown (e.g., the inputs may not be part of the territory management subsystem 720, and are shown as dashed lines), including the dimension data source 718, metrics data 734, and sets of territory dimensions 724 of FIG. 7.

Embodiments may use the territory management subsystem 720 information to create and manage territory proposals and/or other territory features and functionality through a territory model module 802, a quota model module 830, and a quota setup module 840. In some embodiments, the territory model module 802 models a territory 310 as one or more territory versions 820. The territory versions 820 may include data from a number of other functional blocks.

In some embodiments, territory versions 820 are affected by territory proposals 804, territory rules 808, and sales quota plan territory options 834. Embodiments of territory versions 820 may also be characterized by territory types 842, territory status 844, territory resources 846, etc. In certain embodiments, territory rules 808 are defined according to the territory management subsystem 720 information. For example, the territory rules 808 may relate to territory rule boundaries 812 and corresponding territory rule boundary values 816, which may be defined according to territory dimensions 724 and territory dimension members 726, respectively.

Embodiments of the sales quota plan territory options 834 are part of the quota model module 830. A sales quota plan 832 may be related to the territory proposal 804 and may affect or be affected by the sales quota plan territory options 834. The sales quota plan territory options 834 may also relate to a predictor 836 (e.g., a predictor formula).

In some embodiments, the sales quota plan 832 is affected by the quota setup module 840. For example, the quota setup module 840 includes a territory quota 822 and a resource quota 826, each of which relating to parameters of the sales quota plan 832. In certain embodiments, the territory quota 822 and the resource quota 826 interrelate (e.g., the resource quota 826 is the resource quota 826 corresponding to a particular territory identifier passed by the territory quota 822).

The territory quota 822 may further relate to a seasonality group 838 and a territory quota time period 824, each indicating certain time-related characteristics of the territory quota 822. The resource quota 826 may also relate to a set of resources 850 and a resource quota time period 828. In some embodiments, the resource quota time period 828 and the territory quota time period 824 are associated with a set of calendar periods 860.

Some or all of these types of data may be fed back to the territory version 820 parameters. For example, the territory proposal 804 may affect the sales quota plan 832, which may affect the resource quota 826, which may affect the set of resources 850, which may affect the territory resources 846 allocated to the territory version 820. It is worth noting that, in some embodiments, the territory version 820 is part of a greater versioning module. For example, the versioning module may define active territory versions, inactive territory versions, future and proposed territory versions, etc.

It will be appreciated that the systems and techniques described above with reference to FIGS. 1-8 may be used to provide various types of multi-dimensional modeling functionality for territory definition and management. Some of this functionality is further described with reference to the remaining Figures. In particular, the description below focuses on the multi-dimensional definition of territories and the use of those multi-dimensional territories for assigning opportunities.

Figure 9A:
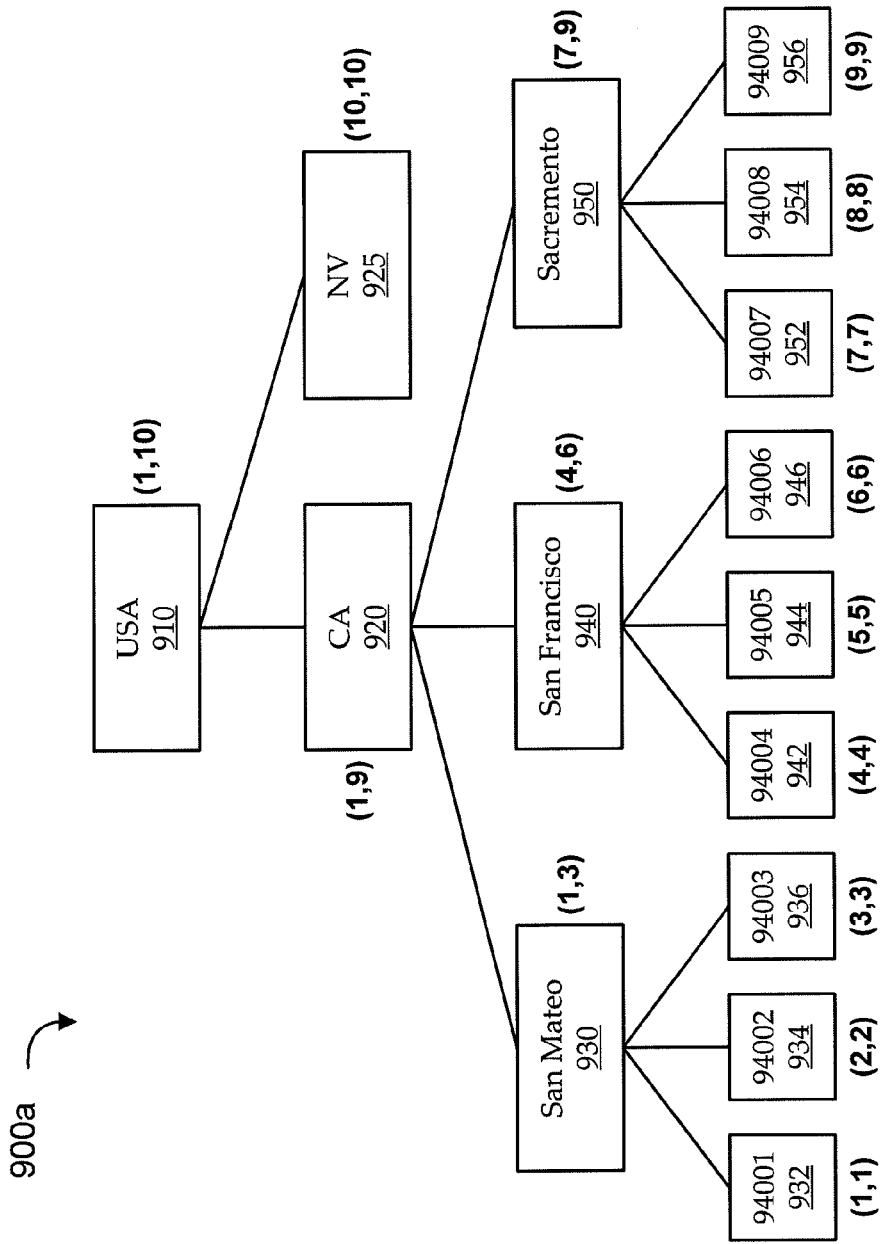
FIG. 9A shows a hierarchy model of an illustrative geography territory dimension of a multi-dimensional territory model.

Turning to FIG. 9A, a hierarchy model 900a is shown of an illustrative geography territory dimension of a multi-dimensional territory model. For example, the hierarchy model 900a may illustrate hierarchical members of a territory dimension of a territory hypercube 450, as described above. According to the embodiment shown, the top level of the hierarchy model 900a (e.g., and of the geography territory dimension 330) represents the entire United States as a single member, "USA" 910. The "USA" 910 member is then segmented into "CA" 920 (California) and "NV" 925 (Nevada). California is further segmented into "San Mateo" 930, "San Francisco" 940, and "Sacramento" 950, each being further segmented by zip code.

Notably, each territory dimension 330 member node is shown to correspond with a tuple, indicating a range over which the member node has jurisdiction. For the sake of illustration, the zip codes of the "San Mateo" 930 node (i.e., nodes "94001" 932, "94002" 934, and "94003" 936) correspond to tuples "(1,1)," "(2,2)," and "(3,3)," respectively. This indicates, for example, that the "94002" zip code has jurisdiction over nodes of the hierarchy ranging from "2" to "2" (i.e., a single node). The "San Mateo" 930 parent node corresponds to tuple "(1,3)," indicating its jurisdiction over nodes ranging from "1" to "3," which further correspond to all its child node zip codes.

It is worth noting that each tuple describes the range of its child nodes, and may not correspond to a count of child nodes. For example, the "USA" 910 node corresponds to tuple "(1, 10)." While there are only ten integers between "1" and "10," the tuple "(1,10)" actually corresponds to fourteen child nodes of the "USA" 910 node in the hierarchy model 900a (e.g., as parent nodes encompass the ranges of their respective child nodes without adding integers to the range).

Figure 9B:
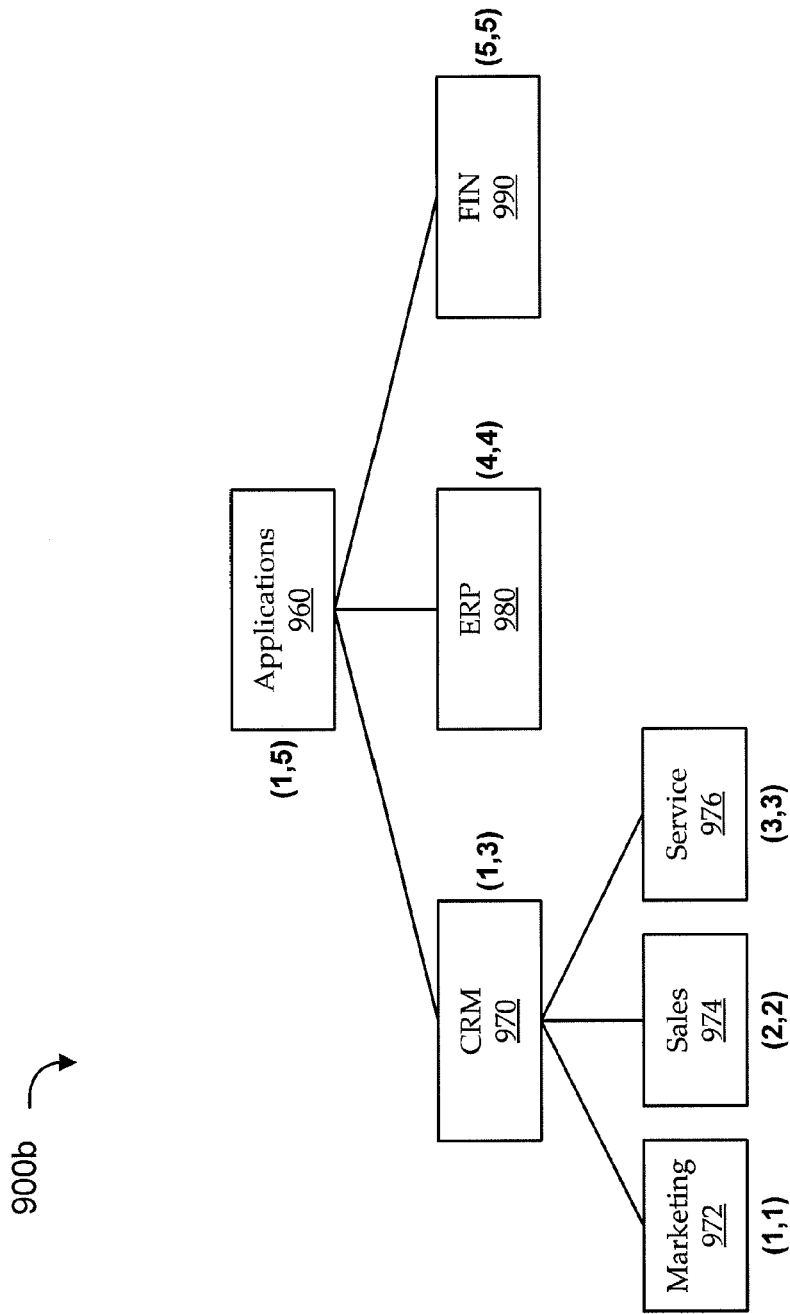
FIG. 9B shows a hierarchy model of an illustrative product territory dimension of a multi-dimensional territory model.

Similarly, in FIG. 9B, a hierarchy model 900b is shown of an illustrative product territory dimension of a multi-dimensional territory model. For example, the hierarchy model 900b may illustrate hierarchical members of another territory dimension 330 of a territory hypercube 450, as described above. According to the embodiment shown, the top level of the hierarchy model 900b (e.g., and of the product territory dimension 330) represents all applications as a single member, "Applications" 960. The "Applications" 960 member is then segmented into "CRM" 970 (customer relationship management applications), "ERP" 980 (enterprise resource planning applications), and "FIN" 990 (financial applications). "CRM" applications are further segmented into "Marketing" 972, "Sales" 974, and "Service" 976 application families.

As in FIG. 9A, each territory dimension 330 member node is shown in FIG. 9B to correspond with a tuple, indicating a range over which the member node has jurisdiction. For the sake of illustration, the "Marketing" 972, "Sales" 974, and "Service" 976 application nodes correspond to tuples "(1,1)," "(2,2)," and "(3,3)," respectively. Their parent, the "CRM" 970 application node, corresponds to tuple "(1,3)," indicating its jurisdiction over nodes ranging from "1" to "3," which further corresponds to all its child node application families.

It is worth noting that each territory dimension 330 of the territory hypercube 450 may be defined according to a hierarchical set of members, such as those illustrated by FIGS. 9A and 9B. As described above, the various territory dimensions 330 define the territory boundary 320, and, thereby, the territory 310. The multi-dimensional territory 310 definition (e.g., the territory hypercube 450) may then be used to provide various types of functionality, such as detection of territory gaps and overlaps, assignment of opportunities (e.g., sales opportunities, leads, accounts, etc.), analysis and reporting of metrics, etc.

Figures 10, 11:
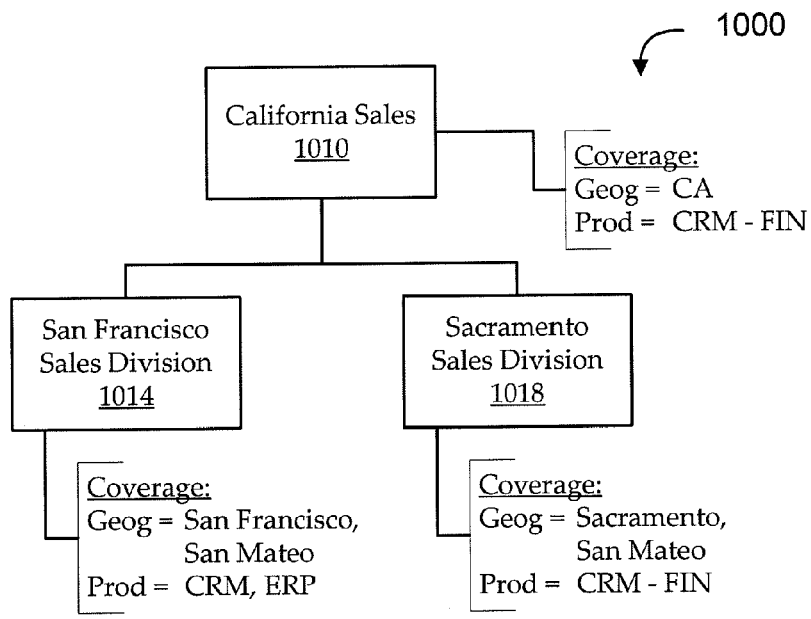
FIG. 10 shows an embodiment of a non-normalized territory assignment.
FIG. 11 shows a de-normalized territory assignment corresponding to the non-normalized territory assignment of FIG. 10.

An embodiment of a territory definition 1000 is shown in FIG. 10. Each node of the territory definition 1000 may represent a territory 310 (e.g., a jurisdiction), which may be a collection of territory cells 410 of a territory hypercube 450. For example, the territory definition 1000 may illustrate a type of "normalized" territory definition 1000. While each territory 310 may be defined according to many territory dimensions 330, the territory definition 1000 is shown according only to the two territory dimensions 330 of FIGS. 9A and 9B (i.e., geography and product) for the sake of clarity.

As illustrated, one territory 310 is defined for "California Sales" 1010. "California Sales" 1010 includes the "CA" 920 geography territory dimension 330 member (e.g., of FIG. 9A) and product territory dimension 330 members ranging from "CRM" 970 to "FIN" 990 (e.g., of FIG. 9B). "California Sales" 1010 is segmented into territories 310 representing a "San Francisco Sales Division" 1014 and a "Sacramento Sales Division" 1018. The "San Francisco Sales Division" 1014 includes the "San Francisco" 940 and "San Mateo" 930 geography territory dimension 330 members (e.g., of FIG. 9A) and "CRM" 970 and "ERP" 980 product territory dimension 330 members (e.g., of FIG. 9B). The "Sacramento Sales Division" 1018 includes the "Sacramento" 950 and "San Mateo" 930 geography territory dimension 330 members (e.g., of FIG. 9A) and product territory dimension 330 members ranging from "CRM" 970 to "FIN" 990 (e.g., of FIG. 9B).

According to many typical rule-based territory 310 definitions, it may be difficult or impossible to efficiently and accurately understand the jurisdictions of and interactions between these territories. For example, suppose a business user desires to determine whether there are any overlaps between the "San Francisco Sales Division" 1014 and the "Sacramento Sales Division" 1018. While some overlaps may be clear (e.g., both divisions appear to service the San Mateo CRM market), others may be difficult to interpret (e.g., whether the "Sacramento Sales Division" 1018 covers "ERP" 980 applications). In some cases, it may be necessary to run scenarios through the rules to try to detect the overlaps. In other cases, it may be necessary to wait until an overlap condition is detected (e.g., two divisions are trying to sell the same product to the same region), at which point there may still be little or no way to efficiently reassign the territories 310 to avoid the condition.

Embodiments of the invention use the multi-dimensional territory 310 definition, along with the corresponding tuple designations described with reference to FIGS. 9A and 9B, to address these issues. For example, FIG. 11 shows a de-normalized territory definition 1100 corresponding to the normalized territory definition 1000 of FIG. 10. The de-normalized territory definition 1100 is illustrated as a table with multiple rows and columns.

In some embodiments, the de-normalized territory definition 1100 is implemented effectively as a dot-product of some or all the territory dimensions 330. The result may be a list of territory 310 conditions configured to be efficiently used for analysis, for example, as part of an MDX query. In the illustrated embodiment, as indicated by the "Territories" 1105 column, each row corresponds to one of the territories 310 (i.e., "California Sales" 1010, "San Francisco Sales Division" 1014, and "Sacramento Sales Division" 1018, respectively). The columns show the dot-product results, including a "Geo Low" 1112 column (a named representation of the low end of the geography territory dimension 330 corresponding to that row), a "Geo High" 1114 column (a named representation of the high end of the geography territory dimension 330 corresponding to that row), a "Geo SeqL" 1116 column (a numbered representation of the low end of the geography territory dimension 330 tuple corresponding to that row), a "Geo SeqH" 1118 column (a numbered representation of the high end of the geography territory dimension 330 tuple corresponding to that row), a "Prod Low" 1122 column (a named representation of the low end of the product territory dimension 330 corresponding to that row), a "Prod High" 1124 column (a named representation of the high end of the product territory dimension 330 corresponding to that row), a "Prod SeqL" 1126 column (a numbered representation of the low end of the product territory dimension 330 tuple corresponding to that row), and a "Prod SeqH" 1128 column (a numbered representation of the high end of the product territory dimension 330 tuple corresponding to that row).

For example, referring to the "Sacramento Sales Division" 1018, the "Sacramento" 950 and "San Mateo" 930 geography territory dimension 330 members included in the division (e.g., according to the territory definition 1000 of FIG. 10) are represented as separate rows. Each row shows the corresponding geography territory dimension 330 tuple from FIG. 9A. For example, the "(7,9)" tuple for "Sacremento" 950 is represented with a "7" in the "Geo SeqL" 1116 column and a "9" in the "Geo SeqH" 1112 column; and the "(1,3)" tuple for "San Mateo" 930 is represented with a "1" in the "Geo SeqL" 1116 column and a "3" in the "Geo SeqH" 1118 column. Further, as discussed with reference to FIG. 10, the illustrative "Sacramento Sales Division" 1018 includes product territory dimension 330 members ranging from "CRM" 970 to "FIN" 990, corresponding to tuples "(1,3)" and "(5,5)," respectively. Accordingly, the range from "CRM" 970 to "FIN" 990 is represented by a "1" in the "Prod SeqL" 1126 column and a "5" in the "Prod SeqH" 1128 column.

Figure 12:
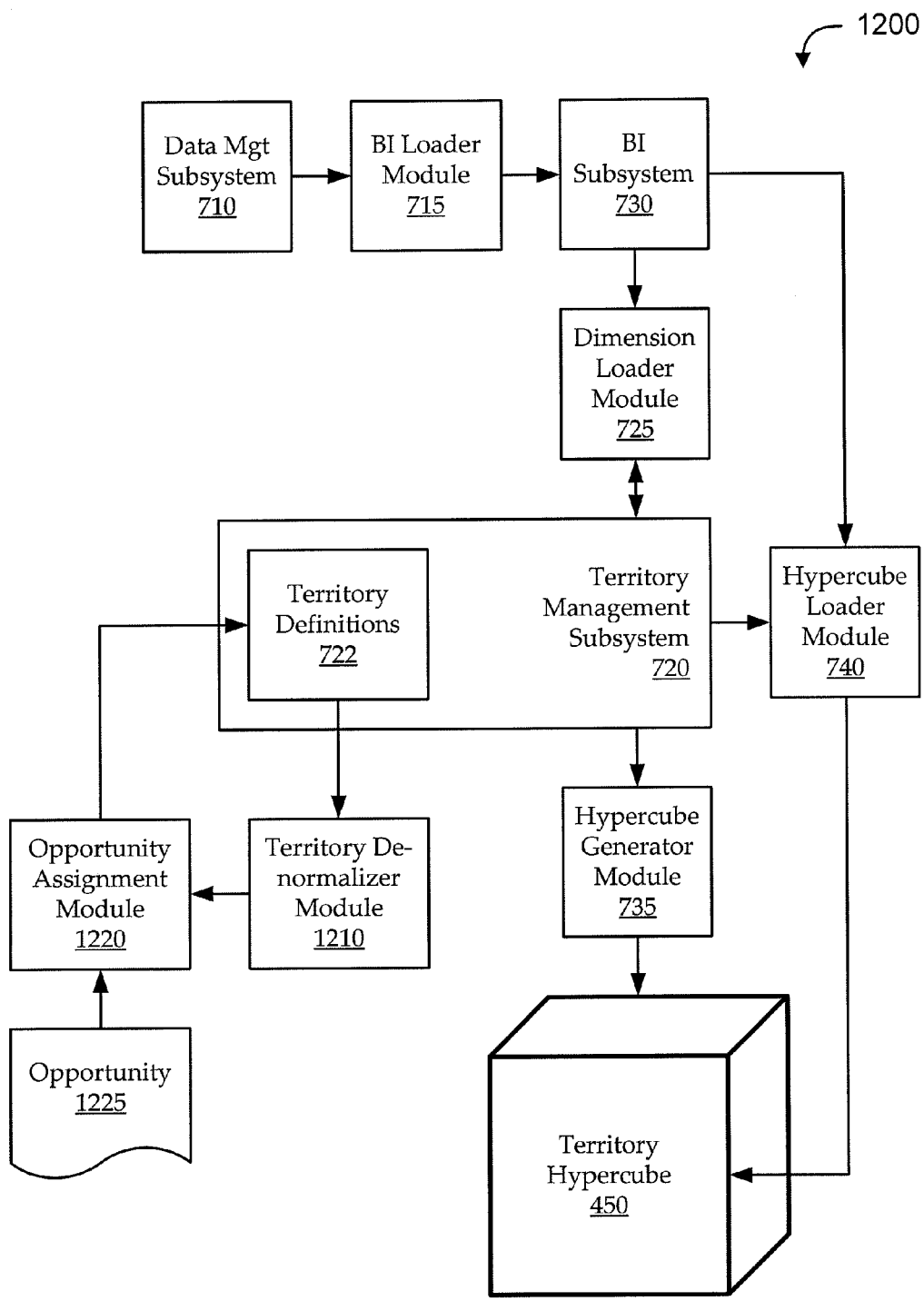
FIG. 12 shows a block diagram of an illustrative system for implementing multi-dimensional territory handling functionality, according to various embodiments.

In some embodiments, de-normalization and other functionality is implemented by a system. FIG. 12 shows a block diagram of an illustrative system 1200 for implementing multi-dimensional territory handling functionality, including opportunity assignments, according to various embodiments. As in the system 700 of FIG. 7 described above, the system 1200 of FIG. 12 may include a number of subsystems, interacting via modules to generate and affect territories and their respective territory definitions, for example, as represented by a territory hypercube 450.

For example, as shown, the system 1200 includes a data management subsystem 710, a territory management subsystem 720, and a business intelligence subsystem 730. The subsystems may interact via a business intelligence loader module 715, a dimension loader module 725, a hypercube generator module 735, and a hypercube loader module 740. Embodiments use the various subsystems and modules to generate and maintain territory data, for example, using the territory hypercube 450.

As described above, some functionality utilizes a de-normalized version of territory definitions. In some embodiments, a territory de-normalizer module 1210 is provided for de-normalizing territory definitions 722 maintained (e.g., as normalized territory definition 1000) by the territory management subsystem 720. For example, an illustrative output of the territory de-normalizer module 1210 may look like the de-normalized territory definition 1100 of FIG. 11.

In some embodiments, the territory de-normalizer module 1210 communicates the de-normalized territory 310 information to an opportunity assignment module 1220. For example, a new sales opportunity 1225 (e.g., lead, account, customer, etc.) is presented to a business owner. The business owner desires to assign the opportunity 1225 to a sales territory 310. According to some embodiments, the de-normalized territory 310 information from the territory de-normalizer module 1210 is used by the opportunity assignment module 1220 to determine an appropriate (e.g., optimal) territory 310 for assignment of the opportunity 1225.

Figure 13:
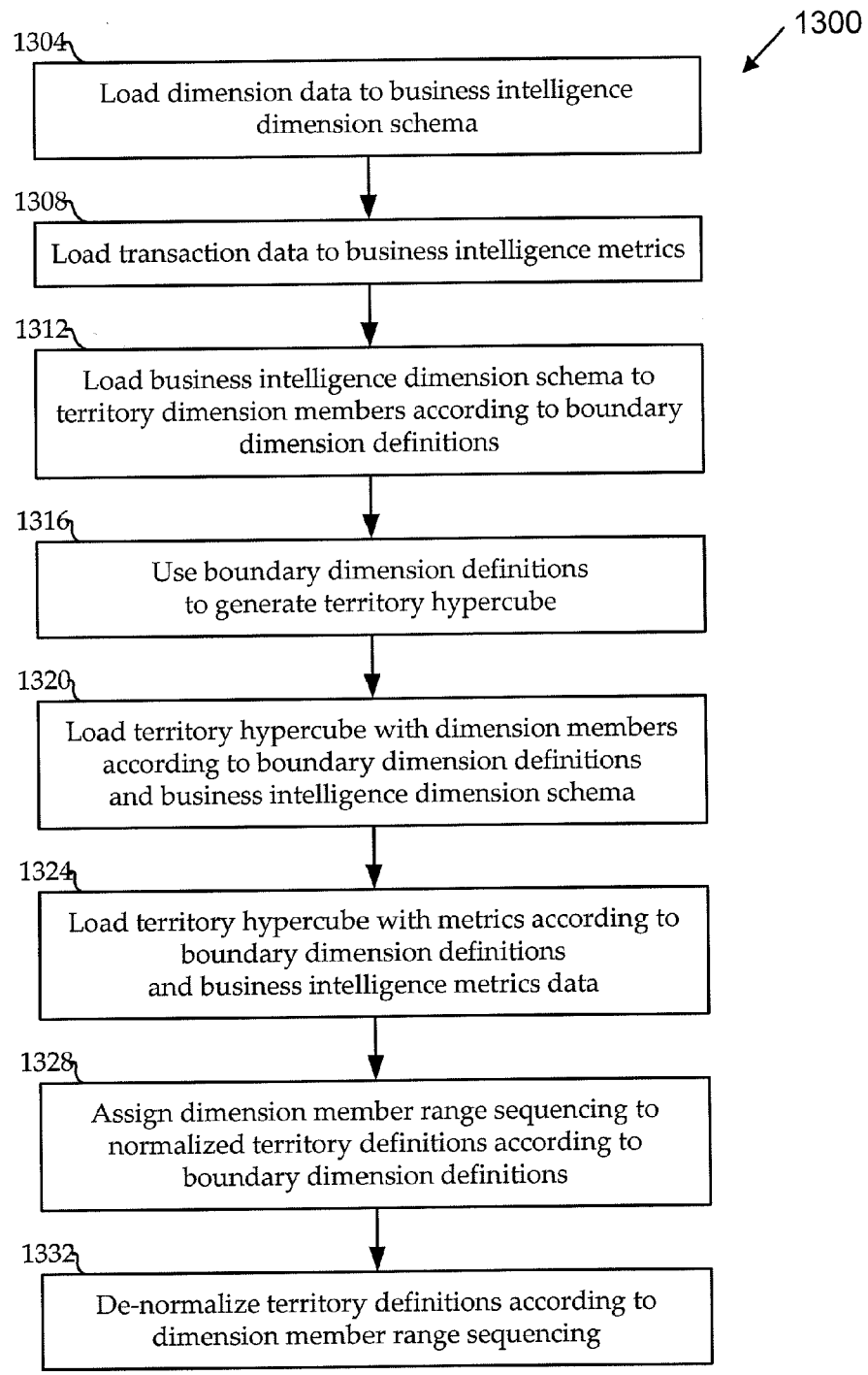
FIG. 13 shows a flow diagram of an illustrative method for multi-dimensional territory definition and handling, according to various embodiments.

FIG. 13 shows a flow diagram of an illustrative method 1300 for multi-dimensional territory definition and handling, according to various embodiments. For the sake of clarity, the method 1300 is described with reference to the system 1200 illustrated in FIG. 12. It will be appreciated that embodiments of the method 1300 may be performed on other systems, and the system 1200 may be used to implement other methods. As such, the description of the method 1300 in context of the system 1200 should not be construed as limiting the scope of the invention.

Embodiments of the method 1300 begins at block 1304 by loading dimension data to business intelligence dimension schema. Transaction data may be loaded to business intelligence metrics data at block 1308. For example, embodiments of the data management subsystem 710 include a transactional data source 714 and a dimension data source 718. Transaction data may be received from various physical territories by the transactional data source 714, and data being input to the system relating to territory dimensions 330 may be received by the dimension data source 718. These data may then be loaded (e.g., by a business intelligence loader module 715) to the business intelligence subsystem 730 as dimensions schema 732 (e.g., in block 1304) and metrics data 734 (e.g., in block 1308).

At block 1312, business intelligence dimension schema is loaded to territory dimension members (e.g., according to territory dimension definitions). For example, embodiments of the territory management subsystem 720 include a set of territory definitions 722, sets of territory dimensions 724, and sets of territory dimension members 726. Dimensions schema 732 may be loaded by a dimension loader module 725 (e.g., in block 1312) to the set of territory dimension members 726 to maintain membership information according to new inputs received via the dimension data source 718.

In some embodiments, at block 1316, the territory dimension definitions are used to generate a territory hypercube 450. For example, a hypercube generator module 735 uses data from the territory management subsystem 720 (e.g., the sets of territory dimensions 724) to generate the territory hypercube 450 and define its size and dimensionality. Notably, as described above, the territory hypercube 450 generated in 1316 can represent one or more territories. At block 1320, the territory hypercube 450 may be loaded with dimension members 726 (e.g., according to territory dimension definitions and business intelligence dimension schema). The territory hypercube 450 may be further loaded with metrics (e.g., according to territory dimension definitions and business intelligence metrics data) at block 1324. For example, a hypercube loader module 740 loads data into the territory hypercube 450, according to the sets of territory dimensions 724 and their respective sets of territory dimension members 726 (e.g., dimensions schema 732, metrics data 734, sets of territory dimensions 724, etc.).

At block 1328, dimension member range sequencing is assigned to the normalized territory definitions according to hierarchical territory dimension member definitions. For example, as illustrated in FIGS. 9A and 9B, ranges are defined for each member node of a territory dimension 330 hierarchy. The range sequencing may be represented by a tuple, or in any other useful way.

The dimension member range sequencing may then be used, at block 1332, to de-normalize territory definitions. For example, a territory de-normalizer module 1210 de-normalizes information from the normalized territory definitions 722 of the territory management subsystem 720. In certain embodiments, the de-normalization is implemented substantially as a dot-product of some or all of the territory dimension members. The de-normalized output (e.g., the output of the territory de-normalizer module 1210) may be configured for use by a SQL, MDX, and/or other similar framework. For example, the de-normalized output may be optimized for efficient querying in a particular query framework.

Figure 14:
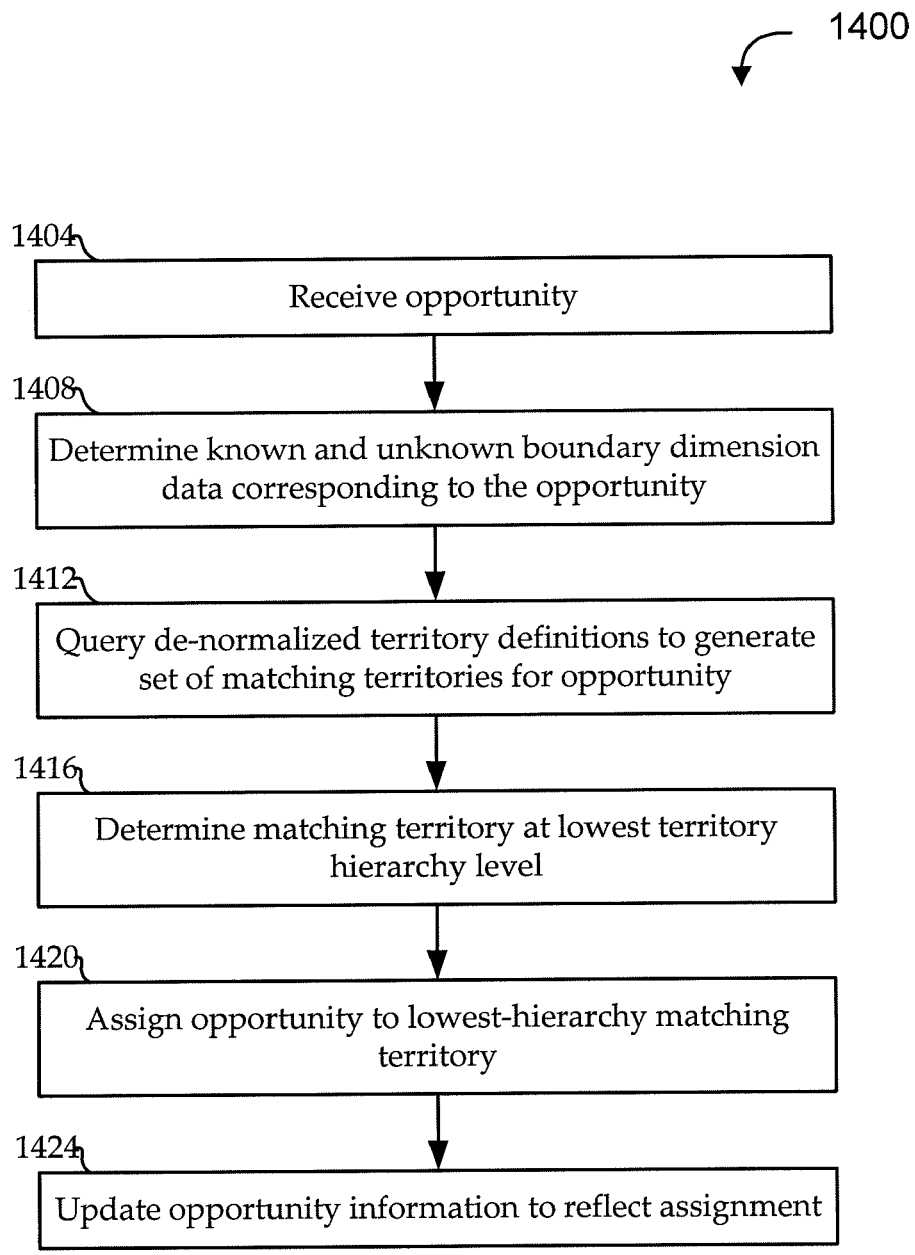
FIG. 14 shows a flow diagram of an illustrative method for assigning opportunities in a multi-dimensional territory environment, according to various embodiments.

As described above, the de-normalized output may be exploited for various types of functionality, including assignment of opportunities. FIG. 14 shows a flow diagram of an illustrative method 1400 for assigning opportunities in a multi-dimensional territory environment, according to various embodiments. As with the method 1300 of FIG. 13, the method 1400 is described in context of the system 1200 of FIG. 12. This descriptive context is intended only for clarity, and should not be construed as limiting the scope of the invention.

Embodiments of the method begin at block 1404 when an opportunity is received. For example, a new sales opportunity 1225 (e.g., lead, account, customer, etc.) is received, and it is desired to assign the opportunity 1225 to an existing sales territory 310. At block 1408, known and unknown territory dimension data corresponding to the opportunity 1225 are determined. For example, for an opportunity 1225, a corresponding specific geography and product family may be known, while a specific product type may be unknown (e.g., and may be considered "Unspecified" for the product type dimension). In certain embodiments, the opportunity 1225 is entered into a system in terms of its corresponding dimension boundary 330 values. For example, the opportunity 1225 is received by the system 1200 with an opportunity identifier, a geographic location, an account type, a product type, an industry type.

It will be appreciated that, when opportunities 1225 arise, it may be difficult to rapidly and unambiguously assign appropriate territories 310 to those opportunities 1225. For example, it may be difficult or impossible, particularly with many typical rule-based architectures, to map attributes of an opportunity 1225 to corresponding hierarchical attributes of territories 310. One reason for this difficulty may be that, as discussed above, the rule-based architecture may be difficult and unpredictable to navigate for end users (e.g., business owners) and even, at times, for IT professionals.

Another reason for this difficulty may be that territorial attributes may not always have a one-to-one correspondence with the opportunity 1225 attributes. For example, a dimensional attribute of the opportunity 1225 may not exist or may be undefined. Similarly, while a dimensional attribute of the opportunity 1225 has no corresponding match in the territory dimension members 726, it may be possible to find a match among an ancestor member. Further, in some cases, a dimensional attribute of the opportunity 1225 may match only at a non-leaf level of the hierarchical territory dimension members 726. In many rule-based architectures, these issues are difficult or impossible to address, for example, because of the sequential nature of rule execution and/or because of a lack of hierarchical treatment of dimension members.

Embodiments use multi-dimensional modeling of the territory 310 to express the rules in terms of territory dimensions 330, territory dimension members, etc. In this way, either or both of territory dimension 330 members and territory definitions 722 can be expressed to account for complex and hierarchical relationships, while avoiding algorithmic rule-based architectures. For example, as described above, a territory definition 722 can be expressed in normalized and/or de-normalized fashions to facilitate certain types of processing.

In some embodiments, at block 1412, the territory dimension data corresponding to the opportunity determined in block 1408 is applied as a query to the de-normalized territory 310 definitions to generate sets of matching territories 310 for the opportunity 1225. For example, referring to the illustrative de-normalized territory definition 1100 of FIG. 11, suppose an opportunity arises for selling ERP applications in Sacramento, California. Applying the dimension member range sequencing of FIGS. 9A and 9B, the opportunity 1225 would be assigned a "7" in the "Geo SeqL" 1116 column, a "9" in the "Geo SeqH" 1112 column; a "4" in the "Prod SeqL" 1126 column, and a "4" in the "Prod SeqH" 1128 column.

According to one embodiment, each row of the de-normalized territory definition 1100 is then checked in block 1412 to determine whether the opportunity 1225 fits fully within the ranges corresponding to the row. For example, a match may be determined for the geography territory dimension when the "Geo SeqL" value for the opportunity 1225 is greater than or equal to the "Geo SeqL" 1116 column value for the row in question, and the "Geo SeqH" value for the opportunity 1225 is less than or equal to the "Geo SeqH" 1118 column value for the row in question. Applying the illustrative opportunity 1225 to the illustrative de-normalized territory definition 1100 yields two matches: the first row representing the entire "California Sales" 1010 territory; and the sixth row representing the "Sacramento" 950 portion of the "Sacramento Sales Division" 1018.

In typical embodiments, parent territories 310 encompass the union of all their child territories 310. As such, it may be typical that any match of a child territory 310 will also yield a match for all parent territories 310 (e.g., parents, grandparents, etc.). In some embodiments, at block 1416, the method 1400 determines the matching territory from the set of matching territories at the lowest territory hierarchy level. In the illustrative example above, the "California Sales" 1010 territory 310 is the parent of the "Sacramento Sales Division" 1018. As such, the row corresponding to the "Sacramento Sales Division" 1018 may be selected as the lowest-hierarchy-level matching territory 310.

At block 1420, when a lowest-hierarchy-level matching territory 310 has been selected, the opportunity 1225 may be assigned to that territory 310. For example, the territory de-normalizer module 1210 may communicate the de-normalized territory 310 information to an opportunity assignment module 1220 which determines the lowest-hierarchy-level matching territory 310 for the opportunity 1225. According to the illustrative example above, the opportunity 1225 may be assigned to the "Sacramento Sales Division" 1018. In some embodiments, the opportunity information (e.g., and/or territory 310 information corresponding to the selected territory 310) is updated to reflect the assignment at block 1424. For example, the "Sacramento Sales Division" 1018 information is updated to reflect assignment of the opportunity 1225 (e.g., in the territory management subsystem 720).

Realignment and Reconciliation Embodiments

As described above, embodiments use multi-dimensional modeling to define territories in such a way as to account for applicable territory criteria as sets with logical boundaries, rather than as a defined rule-based architecture. For example, territory criteria are modeled as hierarchical dimensions that form boundaries to a territory hypercube. The multi-dimensional model is converted into a de-normalized definition configured, for example, to capture the multi-dimensional nature of the sales territory definitions while flattening hierarchical trees and minimizing or eliminating the need for ordinal processing of the data.

In some embodiments, the de-normalized territory definitions are used to optimize identification of territory regions where reassignment of opportunities is appropriate and/or to reassign opportunities in those regions. Some of these functions are referred to herein as "realignment" and/or "reconciliation" of sales territories. Realignment of sales territories may include gap and/or overlap detection, adjustment of dimensions (e.g., dimension members, boundaries, etc.), etc. Reconciliation of sales territories may include assigning or reassigning opportunities to fix gaps or overlaps or to otherwise conform to the realignment. Embodiments of realignment and/or reconciliation functionality are described more fully with reference to FIGS. 15-20.

Figure 15:
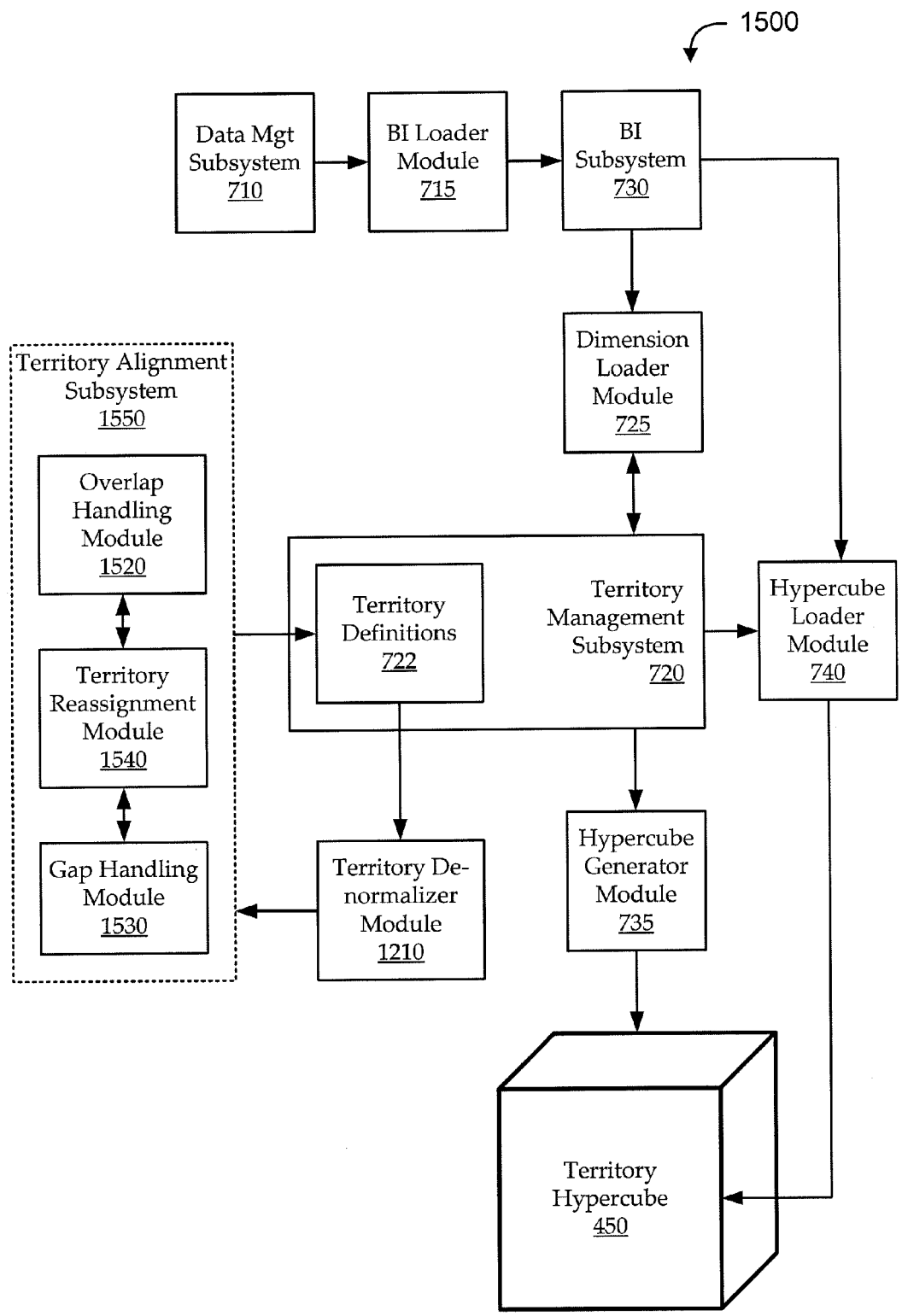
FIG. 15 shows a block diagram of an illustrative system for implementing multi-dimensional territory handling functionality, according to various embodiments.

Turning to FIG. 15, a block diagram is shown of an illustrative system 1500 for implementing multi-dimensional territory handling functionality, according to various embodiments. As in the systems 700 and 1200 of FIGS. 7 and 12 described above, respectively, the system 1500 of FIG. 15 may include a number of subsystems, interacting via modules to generate and affect multi-dimensional territory definitions 722, for example, according to information represented by a territory hypercube 450.

For example, as shown, the system 1500 includes a data management subsystem 710, a territory management subsystem 720, and a business intelligence subsystem 730. The subsystems may interact via a business intelligence loader module 715, a dimension loader module 725, a hypercube generator module 735, and a hypercube loader module 740. Embodiments use the various subsystems and modules to generate and maintain territory data, for example, using the territory hypercube 450.

As described above, some functionality utilizes a de-normalized version of territory 310 definitions and/or territory 310 assignments. In some embodiments, a territory de-normalizer module 1510 is provided for de-normalizing territory 310 information from the normalized territory definitions 722 maintained by the territory management subsystem 720. For example, an illustrative output of the territory de-normalizer module 1510 may look like the de-normalized territory definition 1100 of FIG. 11.

In some embodiments, the territory de-normalizer module 1510 communicates the de-normalized territory 310 information to a territory alignment subsystem 1550. Embodiments of the territory alignment subsystem 1550 include an overlap handling module 1520, a gap handling module 1530, and a territory reassignment module 1540. The overlap handling module 1520 and the gap handling module 1530 use the de-normalized territory 310 information from the territory de-normalizer module 1510 to detect and/or reconcile overlaps and gaps in territory 310 definitions, respectively.

Detection and/or reconciliation of territory 310 gaps and overlaps is referred to herein as territory 310 "alignment." For example, as described above, certain territory dimensions 330 contribute to a definition of the territory boundary 320. When multiple territory dimensions 330 change in a many-dimensional territory 310, it may be difficult to visualize or otherwise determine how those changes may affect other territories 310 (e.g., parent and child territories 310) and/or how those changes may affect current and/or future assignments of opportunities to those territories 310.

As such, having realigned one or more territories 310 using the overlap handling module 1520 and/or the gap handling module 1530, it may be desirable to determine which other territories may be impacted by the realignment. Embodiments of the territory reassignment module 1540 may make this determination and/or reassign opportunities to one or more of those impacted territories. Functionality of the overlap handling module 1520, the gap handling module 1530, and the territory reassignment module 1540 will be further described with reference to the remaining figures below.

Figure 16:
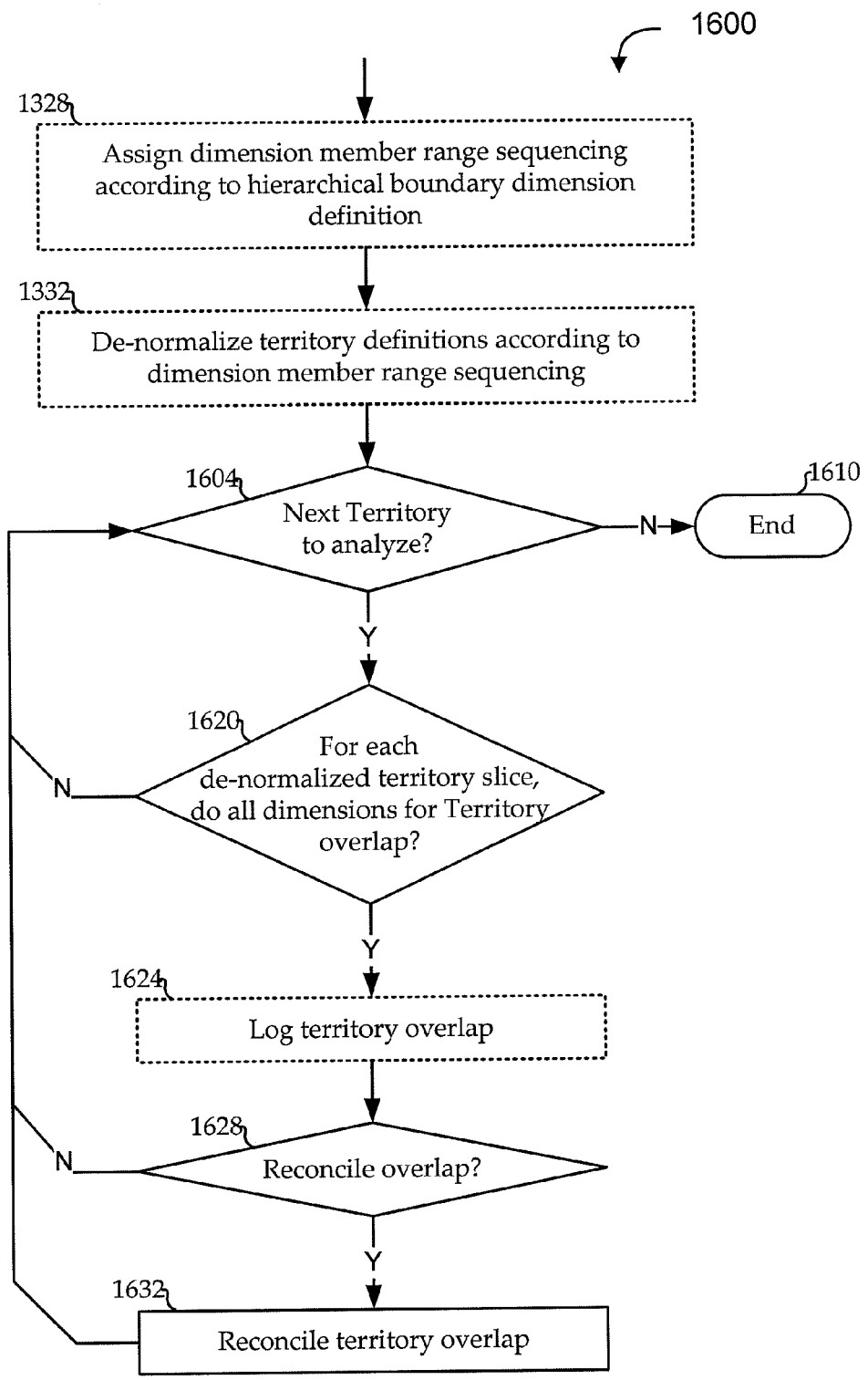
FIG. 16 shows a flow diagram of an illustrative method for overlap handling in a multi-dimensional territory environment, according to various embodiments.

FIG. 16 shows a flow diagram of an illustrative method 1600 for overlap handling in a multi-dimensional territory environment, according to various embodiments. The method 1600 is described in context of the system 1500 of FIG. 15 and in context of method 1300 of FIG. 13 (in particular, blocks 1328 and 1332, shown as dashed boxes). These descriptive contexts are intended only to provide added clarity, and should not be construed as limiting the scope of the invention.

Embodiments of the method 1600 begin by de-normalizing the territory definitions. In some embodiments, a depth-first traversal of a dimension member tree is performed. For example, a sequence (e.g., a unique set of next consecutive integers) is assigned to each leaf node and recursively applied to each parent node of the dimension member tree. Low and high sequence numbers of child nodes are assigned to each parent nodes as minimum and maximum sequence identifiers. Illustrative embodiments of de-normalization techniques are described above, for example, with reference to FIGS. 7 and 9-11, and in blocks 1328 and 1332 of the method 1300 of FIG. 13.

Embodiments of the method iterate through some or all of the territories 310 to detect and/or reconcile overlaps. For example, an analysis set may be defined that includes a de-normalized territory definition of some or all territories for a business owner (e.g., often all the immediate children of a given territory). At block 1604, a determination is made as to whether more territories 310 are remaining (e.g., in the analysis set) for which analysis is desired. If it is determined at block 1604 that no territories 310 remain for analysis, the method 1600 may terminate at block 1610. If it is determined at block 1604 that territories 310 still remain for analysis, the method 1600 may proceed to detect and/or reconcile overlaps.

In some embodiments, the de-normalized territory definition is configured so that each entry of the de-normalized territory definition (e.g., each row) represents a territory slice. As the method 1600 iterates, the territory 310 currently being analyzed may be compared slice-by-slice against slices of some or all other territories (e.g., in the analysis set). It will be appreciated that the de-normalized territory definition may allow this comparison to be implemented in a highly efficient manner using standard data processing techniques.

At block 1620, a determination is made for each territory slice of the territory currently being analyzed as to whether all the dimensions for that territory slice overlap with a territory slice of any other territory in the de-normalized territory definition (e.g., or any other of a subset of territories in the de-normalized territory definition, like the analysis set). Two territories may be considered as overlapping when they have overlapping ranges for all dimensions in respective territory slices. For example, if two territories have simultaneous jurisdiction over the same opportunity (e.g., sales of a particular product in a particular geographic location), they may be said to overlap. If it is determined at block 1620 that none of the territory slice dimension ranges for the currently analyzed territory overlap with territory slice dimension ranges for any other territory, there may be no overlap, and the method 1600 may return to block 1604 to analyze a next territory (e.g., or terminate if no territories are left to analyze).

If it is determined at block 1620 that there is overlap between the currently analyzed territory and at least one other territory, the method 1600 may proceed in a number of ways.

In some embodiments, the overlap is logged at block 1624. For example, it may be desirable to track the overlaps for future processing, statistical analysis, reporting, etc.

In other embodiments, having detected an overlap condition, a determination is made as to whether the overlap is to be reconciled at block 1628. For example, as described above, the territories 310 may be intentionally defined to ensure that a parent always overlaps with all its children (e.g., the territory 310 represented by the parent is at least as large as the union of all the child territories). As such, an analysis of the parent territory slices in block 1620 may indicate an overlap with the territory slices of all its children territories. In some embodiments, child territories are temporarily or permanently removed from the analysis set. In other embodiments, it may be more efficient not to remove child territories from the analysis set, and, instead, to avoid reconciliation of those parent-child overlaps at block 1628. Many other conditions may exist in which it is undesirable to reconcile overlaps. For example, the method 1600 may be used only for reporting and analysis, and not for affecting the current territory 310 definitions in any way (e.g., not for realignment).

If it is determined at block 1628 that the overlap is not to be reconciled, the method 1600 may return to block 1604 to analyze a next territory (e.g., or terminate if no territories are left to analyze). If it is determined at block 1628 that the overlap is not to be reconciled, the method 1600 may reconcile the overlap at block 1632. Reconciliation of the overlap may be performed manually or automatically. Further, reconciliation may be performed iteratively (e.g., during iterative cycles of the method 1600) or only after all overlaps have been detected (e.g., and logged at block 1624).

In some embodiments, rules are identified to determine which territory 310 "wins" when there is a territory overlap. For example, at block 1628, a rule may dictate that overlaps are only resolved between nodes at a comparable dimension member tree hierarchy level (e.g., nodes having a same parent). At block 1632, another rule dictates that reconciliation is performed to maximize total revenue, optimal resource leveling, etc. Reconciliation may involve adding or changing the definition of existing territories to eliminate (e.g., or at least to minimize) the overlap, as described more fully below.

It is worth noting that two territories of different types may overlap without ay consequence. For example, suppose a first territory is for software sales in San Mateo, Calif., and a second territory is for internal information systems (IS) support management in all California branch offices. Overlap between these territories may be handled differently from overlaps between territories of the same type, if at all. For example, it may be inconsequential that these territories overlap, or it may be considered important that each sales territory having a physical location overlaps with an IS support territory.

Figure 17:
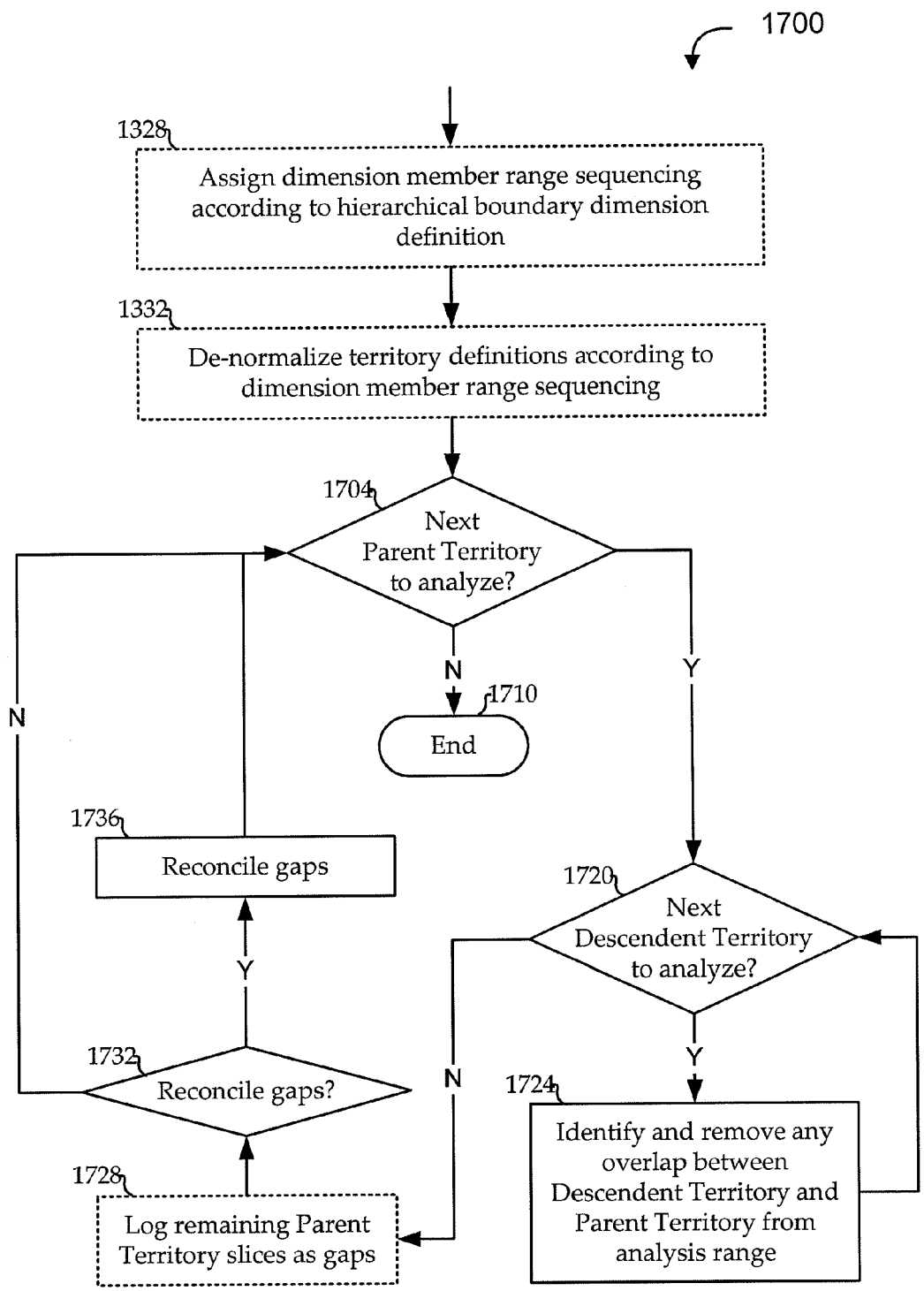
FIG. 17 shows a flow diagram of an illustrative method for gap handling in a multi-dimensional territory environment, according to various embodiments.

FIG. 17 shows a flow diagram of an illustrative method 1700 for gap handling in a multi-dimensional territory environment, according to various embodiments. As with the method 1600 of FIG. 16, the method 1700 is described in context of the system 1500 of FIG. 15 and in the context of method 1300 of FIG. 13 (in particular, blocks 1328 and 1332, shown as dashed boxes). These descriptive contexts are intended only to provide added clarity, and should not be construed as limiting the scope of the invention. For example, embodiments of the method 1700 begin by de-normalizing the territory definitions (e.g., as described with reference to FIGS. 7 and 9-11, and in blocks 1328 and 1332 of the method 1300 of FIG. 13).

Embodiments of the method iterate through some or all of the territories 310 to detect and/or reconcile gaps. For example, an analysis set may be defined that includes a de-normalized territory definition of some or all territories for a business owner. At block 1704, a determination is made as to whether more parent territories 310 are remaining (e.g., in the analysis set) for which analysis is desired. If it is determined at block 1704 that no parent territories 310 remain for analysis, the method 1700 may terminate at block 1710. If it is determined at block 1704 that territories 310 still remain for analysis, the method 1700 may proceed to detect and/or reconcile gaps.

At block 1720, embodiments proceed by iterating through each dependent (e.g., child) node of the parent node currently being analyzed. In some embodiments, the de-normalized territory definition is configured so that each entry of the de-normalized territory definition (e.g., each row) represents a territory slice. As the method 1700 iterates, each child territory 310 may be compared slice-by-slice against its parent territory's slices. It will be appreciated that the de-normalized territory definition may allow this comparison to be implemented in a highly efficient manner using standard data processing techniques.

While child territories 310 remain to be analyzed (e.g., according to the determination of block 1720), overlaps between the child and the parent are removed from analysis at block 1724. As described above, the territories 310 may be intentionally defined to ensure that a parent always overlaps with all its children. Thus, assuming a proper hierarchical territory definition, the territory 310 represented by the parent will be at least as large as the union of all the child territories. If no gaps exist, the territory 310 represented by the parent will be exactly equal to the union of all its child territories. The removal of overlaps at block 1724 may, then, leave behind any territory gaps.

For example, suppose a California territory covers sales in San Francisco, San Mateo, and Sacramento for all CRM, ERP, and FIN software products. A San Francisco territory (a first child of the California territory) covers sales in San Francisco and San Mateo for all CRM and ERP software products, and a Sacramento territory (a second child of the California territory) covers sales in Sacramento for all CRM, ERP, and FIN software products. Prior to any iterations of block 1724 for the California territory, a remaining territory includes the entire California territory. After a first iteration of block 1724, the San Francisco territory may be removed, leaving sales for San Francisco and San Mateo of FIN software products, and sales for Sacramento for all CRM, ERP, and FIN software products. After a second iteration of block 1724, the Sacramento territory may be removed, still leaving sales for San Francisco and San Mateo of FIN software products. No further child territories exist for the California territory, so sales for San Francisco and San Mateo of FIN software products may be left as a gap in the California territory for sales.

After each child territory removal, the method may return to block 1720 to determine whether any child territories remain to be analyzed. When no further child territories remain to be analyzed, the remaining territory may be considered a territory gap for the parent territory (e.g., an unassigned or improperly assigned portion of the parent's territory). In some embodiments, the gap is logged at block 1728. For example, it may be desirable to track the gaps for future processing, statistical analysis, reporting, etc.

In other embodiments, having detected a gap condition, a determination is made as to whether the gap is to be reconciled at block 1732. For example, a business owner may be aware of a gap left intentionally for some reason. In another example, the method 1700 may be used only for reporting and analysis, and not for affecting the current territory 310 definitions in any way (e.g., not for realignment). If it is determined at block 1732 that the gap is not to be reconciled, the method 1700 may return to block 1704 to analyze a next parent territory (e.g., or terminate if no parent territories are left to analyze).

If it is determined at block 1732 that the gap is to be reconciled, the method 1700 may reconcile the gap at block 1736. Reconciliation of the gap may be performed manually or automatically (e.g., according to automated rules) or using a combination thereof. Further, reconciliation may be performed iteratively (e.g., during iterative cycles of the method 1700) or only after all gaps have been detected (e.g., and logged at block 1728). Reconciliation may involve adding or changing the definition of existing territories to eliminate (e.g., or at least to minimize) the gap. For example, a business owner or a computer system may analyze gaps logged at block 1728, and assign each of the gaps to a territory to remove the gap (e.g., according to predefined rules, to affect metrics in a certain way, etc.).

In some embodiments, assignment of gaps may be considered a realignment of at least a limited subset of the territories. As such, it may be desirable to detect and/or reconcile overlaps (e.g., by the method 1600 of FIG. 16) that may be created by the new assignments. In fact, a number of circumstances may cause realignment of sales territories 310 (e.g., including reconciliation of overlaps) to be desirable.

Figure 18:
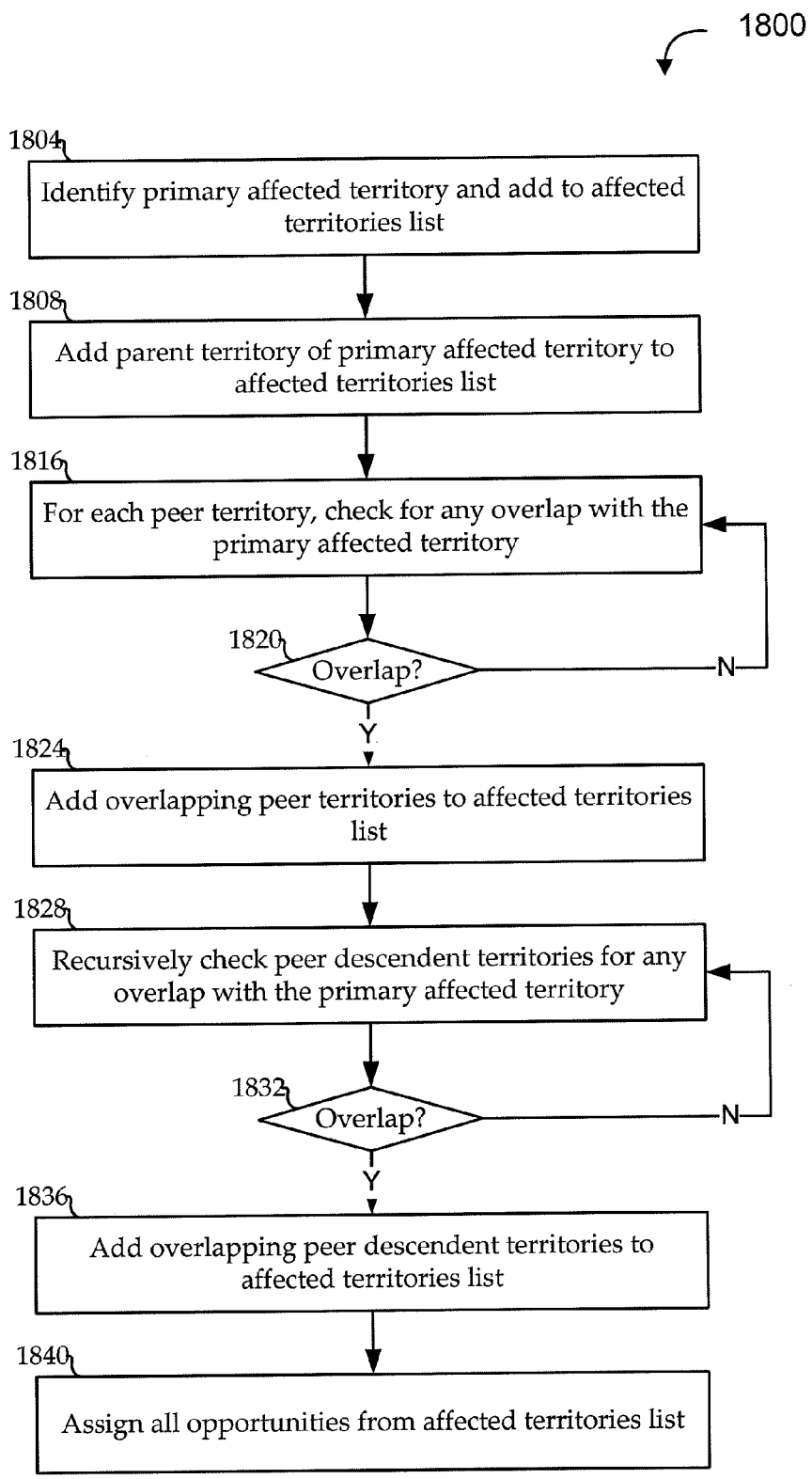
FIG. 18 shows a flow diagram of an illustrative method for realignment and reconciliation of multi-dimensional territories, according to various embodiments.

FIG. 18 shows a flow diagram of an illustrative method 1800 for realignment and reconciliation of multi-dimensional territories, according to various embodiments. A goal of realignment and reconciliation may be to reassign opportunities where necessary or desirable to optimize territory definitions. For example, optimizing the territory definitions may seek to reduce or eliminate overlaps, to maximize or minimize certain types of sales metrics (e.g., according to a metrics territory dimension 330, as described above), etc.

Notably, there may be an optimal subset of territories to reconcile (e.g., for which opportunities should be reassigned). Reconciling too few territories may be sub-optimal, as certain gaps, overlaps, and/or other issues may not be adequately addressed. As such, some embodiments may simply reconcile all territories, for example, to ensure that no reconciliation opportunities are missed. However, reconciling too many territories may also be sub-optimal, as it may be inefficient to reconcile territories unnecessarily. As such, other embodiments determine the optimal subset of territories to reconcile prior to engaging in reconciliation techniques.

Embodiments of the method 1800 begin at block 1804 by identifying a primary affected territory and adding the primary affected territory to an affected territories list. The primary affected territory may be a territory that is either added, changed, or deleted in a proposal or otherwise as a result of realignment. For example, if an overlap condition is detected, at least one of the overlapping territories is added in a particular iteration of the method 1800 to the affected territories list as the primary affected territory. Where each territory only has a single dimension, it may be relatively simple to determine overlaps and/or other conditions, and even to reconcile those conditions. However, using traditional rule-based techniques, as the number of dimensions increases, it may become increasingly difficult to determine which other territories may be affected by any change to a given territory size. For example, any territory's "size" becomes increasingly difficult to characterize in any precise or reliable way under a traditional rule-based paradigm. Embodiments of the method 1800 exploit the de-normalized territory definitions to make these determinations in a reliable and efficient manner.

At block 1808, the parent territory of the primary affected territory is added to the affected territories list, if a parent exists. For each peer territory (e.g., territories having the same parent and at the same level of a hierarchical tree), a check may be made at block 1816 for any overlap between the peer node and the primary affected territory. For example, the check at block 1816 may be performed according to the method 1600 of FIG. 16.

A determination is made at block 1820 as to whether an overlap is detected among the peer nodes. If it is determined at block 1820 that no overlap is detected among a peer node, the method 1800 may iterate for other peer nodes (e.g., return to block 1816) until all peer nodes are evaluated for overlap. If it is determined at block 1820 that an overlap is detected among the peer nodes, any overlapping peer territories are added to the affected territories list at block 1824.

At block 1828, having added peer nodes to the affected territories list, each added peer node's descendent territories may be recursively checked for any overlap with the primary affected territory (e.g., according to the method 1600 of FIG. 16). A determination is made at block 1832 as to whether an overlap is detected among the peer nodes' descendent nodes and the primary affected node. If it is determined at block 1832 that no overlap is detected among a peer node's descendent territory, the method 1800 may iterate for other peer node descendents (e.g., return to block 1828) until all peer node descendents are evaluated for overlap. If it is determined at block 1832 that an overlap is detected among the peer nodes' descendent territory, any overlapping peer descendent territories are added to the affected territories list at block 1836.

It will be appreciated that the affected territories list, produced by blocks 1804-1836, may now represent the set of all territories affected by any change to the primary affected territory. This may also be equivalent (e.g., or substantially equivalent) to an optimal set of territories for which to reassign opportunities after potentially affecting the boundaries of the primary affected territory. Typically, the affected territories list will include at least all the territories actually affected by a change to the primary affected territory boundaries, while being at least as efficient as reconciling all territories.

In some embodiments, opportunities currently assigned to any territories in the affected territories list may be reassigned at block 1840. As discussed above, reconciliation may be performed in various ways. Some techniques for reconciliation of the territories in the affected territories list, including techniques for assignment of opportunities to multi-dimensional territories, are described above with reference to FIGS. 12-14.

For example, all existing opportunities covered by the list of affected territories are individually reassigned. Known and unknown territory dimension data corresponding to the opportunity may be determined and entered into a system (e.g., the system 1500 of FIG. 15) in terms of its corresponding dimension boundary member values. The territory dimension data corresponding to the opportunity may be applied as a query to the de-normalized territory definitions of each territory in the list of affected territories to generate sets of matching territories for the opportunity. Each row of the de-normalized territory definition is then checked to determine whether the opportunity fits fully within the ranges corresponding to the row. When an opportunity fits fully within multiple territories, some embodiments may select the matching territory from the set of matching territories at the lowest territory hierarchy level for assignment of the opportunity.

Figure 19:
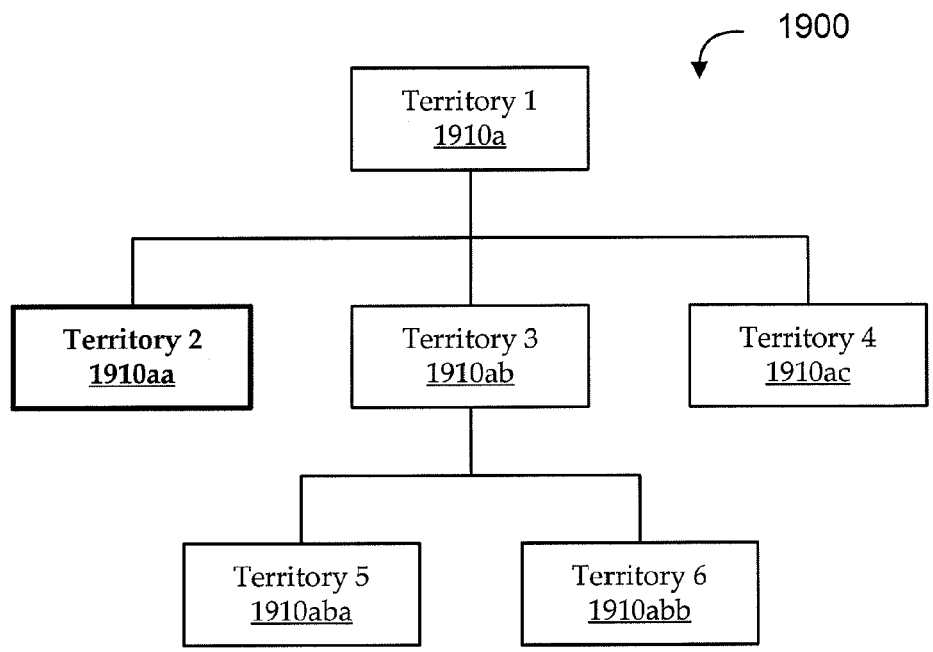
FIG. 19 shows an illustrative territory hierarchy to illustrate certain features described above.

FIG. 19 shows an illustrative territory hierarchy 1900 to illustrate certain features described above. The territory hierarchy 1900 is intended only to be one example of a territory hierarchy 1900, and should not be construed as limiting in any way. The territory hierarchy 1900 includes six territory nodes 1910 in a hierarchy (labeled "Territory 1" 1910a through "Territory 6" 1910abb). "Territory 1" 1910a has three children: "Territory 2" 1910aa, "Territory 3" 1910ab, and "Territory 4" 1910ac. "Territory 3" 1910ab has two children of its own (grandchildren of "Territory 1" 1910a): "Territory 5" 1910aa and "Territory 6" 1910abb.

Figure 20:
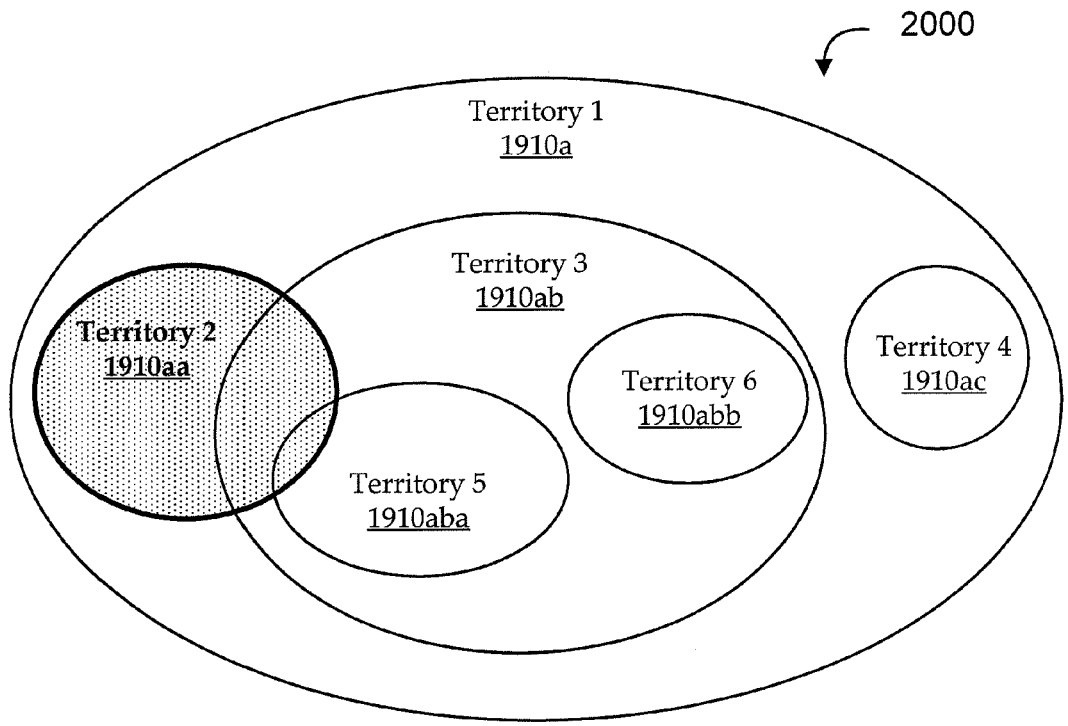
FIG. 20 shows an illustrative Venn diagram of territories shown in FIG. 19.

FIG. 20 shows an illustrative Venn diagram 2000 of territories 1900 of FIG. 19. It will be appreciated that, in a traditional rule-based paradigm, it may be difficult to determine which, if any, dimension is affected by a particular change; and it may be exceedingly difficult to determine what impact multi-dimensional changes have on assignments. As such, the Venn diagram 2000 represents a highly simplified case of a change in a single territory, where the changed territory has already somehow been identified, to illustrate certain functionality of the method 1800 of FIG. 18.

It is assumed that a change is made to the boundaries of "Territory 2" 1910aa. It is further assumed that a business owner associated with the territory hierarchy 1900 desires to realign and reconcile all affected territories subsequent to the change to the "Territory 2" 1910aa boundaries. According to the method 1800 of FIG. 18, "Territory 2" 1910aa is added to the affected territories list as the primary affected territory (block 1804). According to block 1808, "Territory 1" 1910a, the parent territory of the primary affected territory, is added to the affected territories list.

According to block 1816, each peer territory is checked for overlap. In this illustrative case, "Territory 3" 1910ab and "Territory 4" 1910ac are each checked for overlap. As illustrated in FIG. 20, and according to the determination in block 1820, "Territory 3" 1910ab is determined to overlap, and "Territory 4" 1910ac is determined not to overlap. At block 1824, the overlapping peer territory, "Territory 3" 1910ab, is added to the affected territories list.

At block 1828, having added "Territory 3" 1910ab to the affected territories list, all descendent territories of "Territory 3" 1910ab (i.e., "Territory 5" 1910aba and "Territory 6" 1910abb) are recursively checked for any overlap with the primary affected territory, "Territory 2" 1910aa. According to block 1832, it is determined that "Territory 5" 1910aba overlaps, and "Territory 6" 1910abb does not overlap. As such, the overlapping peer descendent territory, "Territory 5" 1910aba, is added to the affected territories list at block 1836.

After blocks 1804-1836, the illustrative affected territories list includes "Territory 1" 1910a, "Territory 2" 1910aa, "Territory 3" 1910ab, and "Territory 5" 1910aba. It will be appreciated, as illustrated by FIG. 20, that this affected territories list includes at least the region that could possibly be affected by the boundaries of "Territory 2" 1910aa. Further, the affected territories list includes fewer than all the territory nodes 1910 in the territory hierarchy 1900, thereby avoiding reconciling all territory nodes 1910 in the territory hierarchy 1900. As discussed above, having provided the affected territories list, some or all opportunities assigned to those affected territory nodes 1910 can be reassigned.

Sandboxing and/or What-If Analysis Embodiments

It will be appreciated from the above that embodiments use multi-dimensional modeling to define territories in such a way as to provide certain types of functionality. For example, territory criteria are modeled as hierarchical dimensions that form boundaries to a territory hypercube, and the multi-dimensional model is converted into a de-normalized definition. As described above, the territory hypercube (e.g., and/or the de-normalized territory definitions) can be used to optimize assignment of opportunities to sales territories, for realignment of sales territories, for reconciliation of realigned territories, etc.

In other embodiments, the de-normalized territory definitions are used to facilitate territory proposal functionality, including sandboxing and/or what-if analysis. For example, changes to territories typically involve multiple steps of analysis of various alternatives and consultation with various levels of management. This may take several days, weeks, or even months. While these changes are being prepared, the sales force may have to continue operating on a stable definition of territories.

In some embodiments, to facilitate these parallel activities, sandbox functionality is provided in which territory change proposals are prepared in parallel with ongoing sales operation, and are only activated (e.g., put into the production environment) when deemed ready for production. For example, a territory proposal may be configured as a sandbox container used to model territory changes. The sandbox container may have a name (e.g., "FY2010 Realignment"), an owner (e.g., sales administrator, sales manager, etc.), and an activation date. The owner may effectively own (or be responsible for, etc.) the territory proposal, such that the owner is authorized to request activation of the territory proposal on the activation date.

Territory proposals may be owned (e.g., managed) by global sales administrators, sales managers, etc., or sales managers or executives may have their own administrators. For example, in one business, global sales administrators manage territory proposals on behalf of all sales executives and sales managers. In another business, sales executives and sales managers manage their own territories through proposals, and the scope of territories that can be viewed by sales executives and sales managers is limited to their own territories and their descendents. In still another business, specific sales administrators that have been delegated authority by their sales manager or executive have a scope of territory that is limited to the visibility of their manager. It will be appreciated that many types of hierarchies of ownership, including permissions and/or authorizations, are possible without departing from the scope of embodiments.

Upon activation of the territory proposal, any proposed changes may be activated within the production environment. Notably, territory proposals may facilitate modeling of territory changes within the same physical instance of the application as production territories. For example, territory changes modeled in the proposal are shielded from production territories and assignment. There may be multiple territory proposals under preparation simultaneously (e.g., multiple territory changes may be delegated to sales executives simultaneously).

Figure 21:
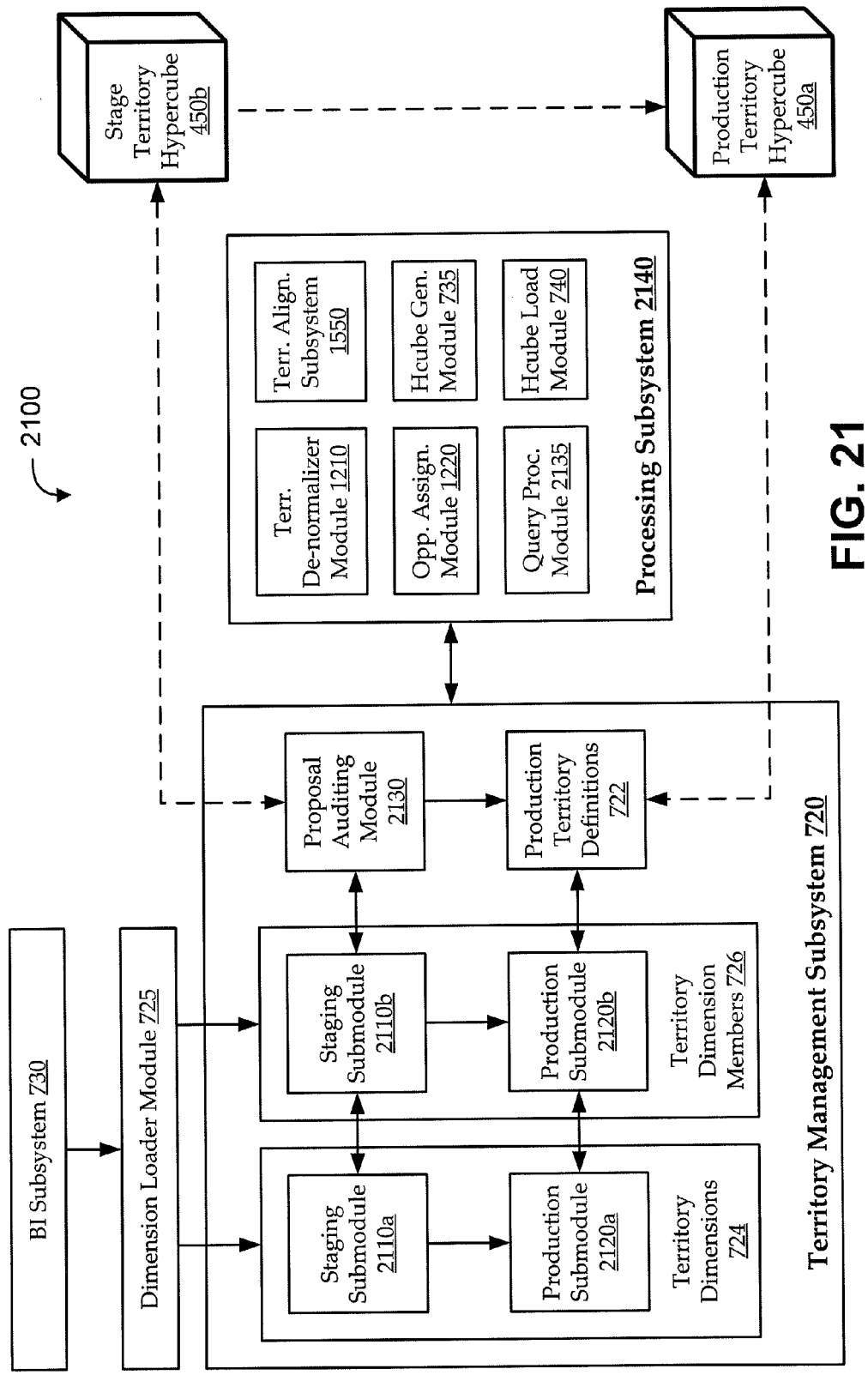
FIG. 21, a block diagram is shown of an illustrative system for implementing territory proposal functionality in the context of a multi-dimensional territory environment, according to various embodiments.
Figure 22:
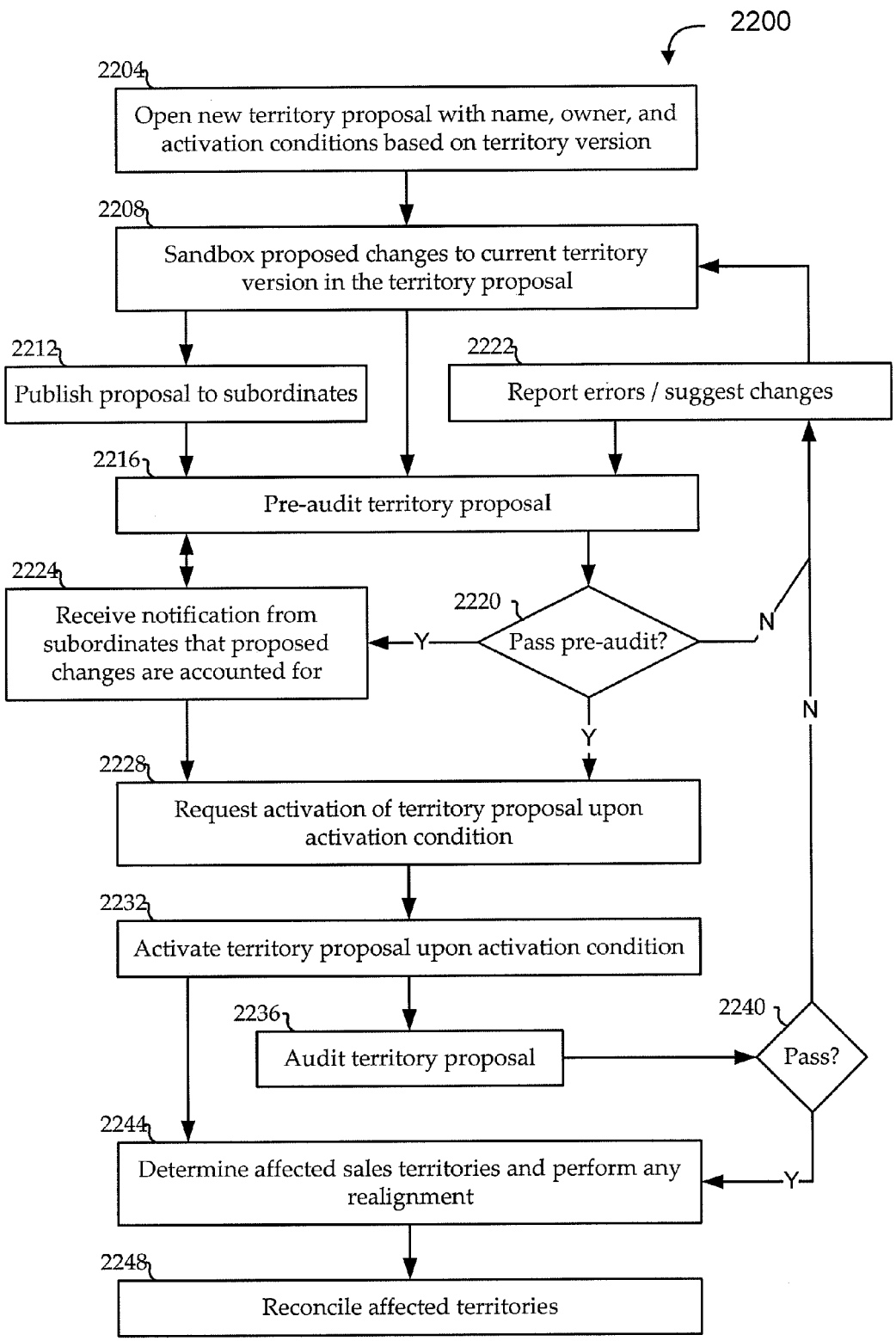
FIG. 22 shows a flow diagram of an illustrative method for handling territory proposals in the context of a multi-dimensional territory, according to various embodiments.
Figure 23:
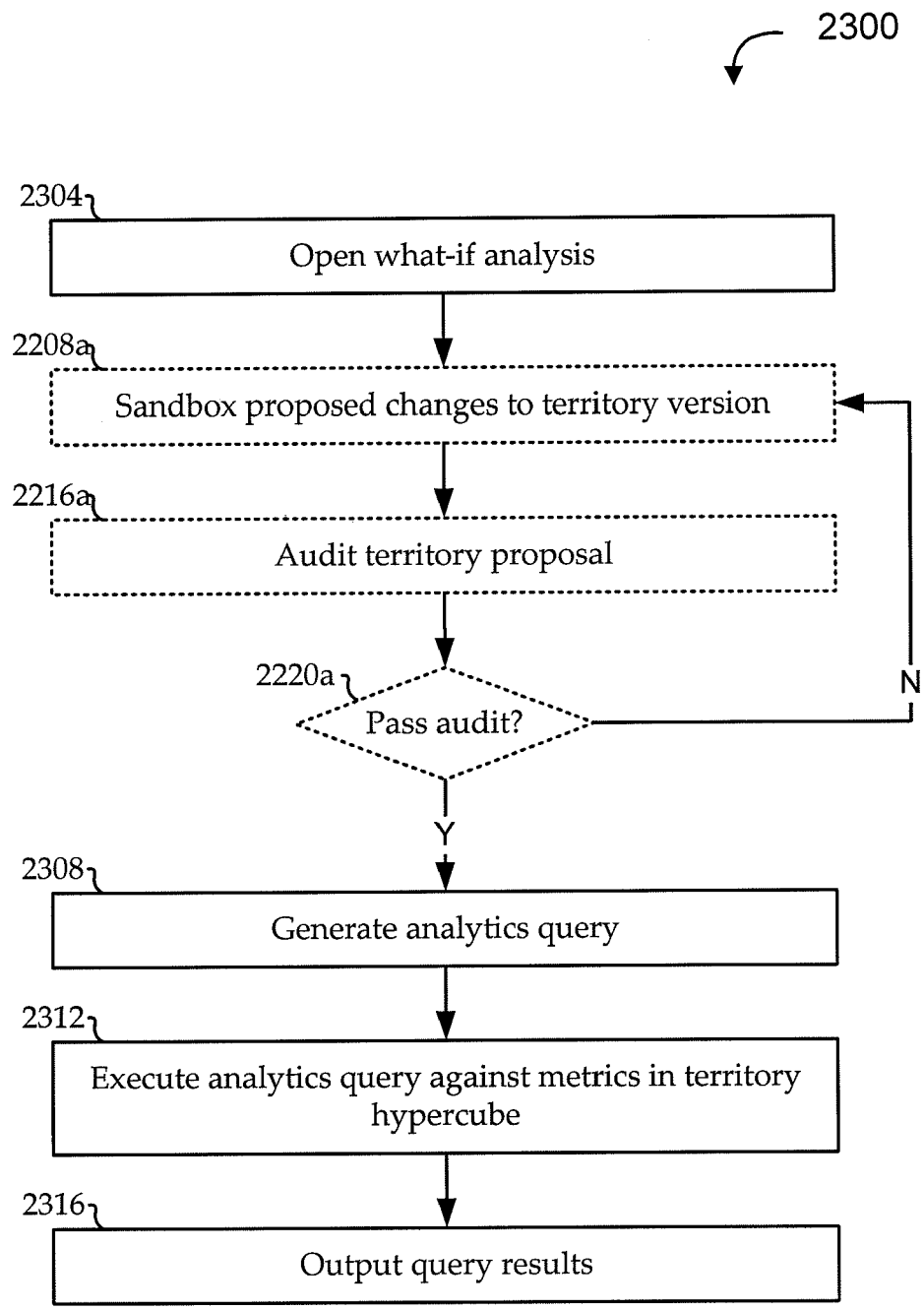
FIG. 23 shows a flow diagram of an illustrative method for implementing what-if analyses in the context of a multi-dimensional territory, according to various embodiments.

FIGS. 21-23 show illustrative systems and methods for implementing various types of territory proposal (e.g., sandboxing and/or what-if analysis) functionality. It will be appreciated that the systems and methods of FIGS. 21-23 are intended only to be illustrative of certain functionality and are not intended to be limiting. In fact, territory proposal functionality may be implemented using and/or along with any of the systems or methods described above.

Turning to FIG. 21, a block diagram is shown of an illustrative system 2100 for implementing territory proposal functionality in the context of a multi-dimensional territory environment, according to various embodiments. As in the systems 700, 1200, and 1500 of FIGS. 7, 12, and 15 described above, respectively, the system 2100 of FIG. 21 may include a number of subsystems, interacting via modules to generate and affect a territory hypercube 450 (e.g., a production territory hypercube 450a). Notably, as illustrated, the system 2100 may further generate and affect a stage territory hypercube 450b. It will be appreciated that other systems described above may similarly interact with a stage territory hypercube 450b, though not explicitly shown in their respective Figures.

The system 2100 includes a territory management subsystem 720, a business intelligence subsystem 730, and a processing subsystem 2140. The subsystems may interact (e.g., via various modules) to generate and maintain territory 310 data, for example, using the production territory hypercube 450a and/or the stage territory hypercube 450b, and territory definitions 722. As described above (e.g., with reference to FIG. 7), embodiments of the territory management subsystem 720 are configured to define and manage territories 310. In some embodiments, the territory management subsystem 720 includes a set of production territory definitions 722 for defining territories 310 (e.g., as a set of territory cells 410 in a territory hypercube 450), sets of territory dimensions 724 (e.g., as a set of territory dimensions 330 associated with a territory hypercube 450), and sets of territory dimension members 726 (e.g., as sets of members or nodes corresponding to each of the territory dimensions 330 of a territory hypercube 450).

In many typical environments, most sets of territory dimensions 724 rarely change. However, the frequency of change can be impacted by factors, such as the granularity of the explicit territory dimension members 726 in each territory dimension 724. For example, leaf members and [Others] members may be aggregates of finer grain implicit members that may change more frequently. The sets of territory dimensions 724 may be set up to define this level of granularity in such a way as to make the sets of territory dimensions 724 more resilient over time.

When changes do occur, however, it may be important to account for those changes, while maintaining the integrity of the current production territory definitions 722 (i.e., the production territory hypercube 450a). For the sake of illustration, territory change proposals may be considered in two categories. One category includes changes to territory definitions 722 that do not impact the production territory hypercube 450a. Another category includes changes to the territory definitions 722 that require a change (e.g., a restructuring) of the production territory hypercube 450.

For example, as discussed above, the production territory hypercube 450a represents the entire market, such that it includes all the dimensions having all the respective dimension members needed to encompass all the territory definitions 722. If territories 310 are realigned or otherwise changed within the current boundaries of the market, they can still be defined as a set of cells of the current production hypercube 450a. Some changes, however, involve a change to the market itself. For example, adding or removing product types, explicitly designated geographic regions, additional dimensions, etc. may involve restructuring the production territory hypercube 450a by changing its dimensionality, its size in one or more dimensions, etc.

For proposals involving changes that do not affect the production territory hypercube 450a, the proposal can be evaluated in the context of the production territory hypercube 450a without impacting the production territory hypercube 450a. For example, a proposed set of territory definitions can be created (e.g., using the proposal auditing module 2130) as sets of cells of the production territory hypercube 450a. The proposed territories can then be analyzed to detect gap and/or overlap conditions, to preview current and future assignments of opportunities, to evaluate affects to metrics data stored in the cells of the production territory hypercube 450a, etc.

Where the proposals involve changes that do affect the production territory hypercube 450a, embodiments provide a separate staging environment. For example, changes to the sets of territory dimensions 724 may affect and even invalidate production territories, causing, not only gap and/or overlap conditions, but references to members that no longer exist, and/or other issues affecting the integrity of unchanged territory definitions 722, as well as the integrity of the production hypercube 450a itself To maintain integrity of the production territory definitions 722 and the production hypercube 450a, the changes may be sandboxed in the staging environment before being promoted to the production environment.

Embodiments of the staging environment validate dimensional changes, for example, to ensure that they do not invalidate production territories before such changes are promoted into production. If dimensional changes would invalidate production territories 310 (e.g., as defined by the production territory definitions 722 and the production territory hypercube 450a), the system 2100 may not promote sandboxed changes to the production environment and may, instead, automatically create an error correction proposal for administrators to correct the invalid territories 310 or otherwise alert a proposal owner of errors. Once errors are corrected, dimensional changes may be promoted to production (e.g., together with the correction proposal).

For example, as illustrated in FIG. 8 above, a territory 310 may be described by a particular territory version 820. A territory proposal 804 may be generated using a territory version 820 as its base territory model 802. The territory model 802 may include territory rules 808, territory rule boundaries 812, territory rule boundary values 816, etc. that interact with particular sets of territory dimensions 724 and territory dimension members 726 through the territory management subsystem 720.

As part of the proposal processes, this and/or other information from the territory model 802 (e.g., information about the territory version 820) is loaded, using the dimension loader module 725, to a staging submodule 2110a of the territory dimensions 724 and a staging submodule 2110b of the territory dimension members 726. In that staging environment, changes may be made to the territory dimensions 724 and/or to the territory dimension members 726, which may impact territory boundaries, opportunity assignments, hypercube 450 boundaries, etc.

The changes may be audited by a proposal auditing module 2130 to determine whether there are any errors. In various embodiments, the errors may include references to non-existent territory dimension members 726, duplicative information, gap conditions, overlap conditions, undesirable changes to territory metrics or other analytics, etc. Raw and/or audited information may be loaded to the stage territory hypercube 450b for further processing or analysis.

Modules of the processing subsystem 2140 may be used to analyze and/or affect the proposed territory definitions. Embodiments of the processing subsystem 2140 include a territory de-normalizer module 1210, an opportunity assignment module 1220, a territory alignment subsystem 1550 (e.g., including an overlap handling module 1520, a gap handling module 1530, and a territory reassignment module 1540 (not shown)), a hypercube generator module 735, and/or a hypercube loader module 740, all of which are described above. Some embodiments of the processing subsystem 2140 include a query processing module 2135 for implementing various query-related functions, including, for example, what-if analysis and analytics reporting, as described more fully below.

When proposed changes (e.g., a territory proposal 804) are complete, the changes may be put into production. In some embodiments, any changes are communicated to and/or approved by (e.g., discussed with) subordinates prior to activation. Further, in some embodiments, activation is requested by the proposal owner to occur on some trigger condition. For example, the owner may request activation of the proposal at a particular date and/or time, when a particular metric reaches a certain threshold value, or on any other useful trigger condition. In certain embodiments, the proposal auditing module 2130 audits the proposal (e.g., again or for the first time) substantially upon activation of the proposal.

When the proposal is activated, changes may be promoted to a production environment. For example, when the proposal does not impact the production hypercube 450a, promoting the proposed changes may simply involve replacing the current production territory definitions 722 with the proposed territory definitions (e.g., and storing the replaced territory definitions as a previous version in some embodiments). When the proposal does affect the proposed territory hypercube 450a, such that the proposal would involve creation of a stage territory hypercube 450b and a staging environment, the proposed changes may be promoted from the staging environment to the production environment. For example, any information in the staging submodules 2110 are promoted to respective production submodules 2120 of the territory dimensions 724 and territory dimension members 726.

It is worth noting that multiple proposals may be maintained concurrently, each having a different trigger condition. For example, a series of changes is proposed to occur, once per month, for the next six months. In some cases, the validity of these proposals will change over time. For example, while a proposal may be valid according to the current production territory hypercube 450a and/or the current production territory definitions 722, the proposal may no longer be valid by the time it is activated.

Accordingly, embodiments allow the proposals to be audited at the time of creation and also upon activation. In some embodiments, additional auditing times are provided. For example, all pending proposals may be automatically audited whenever any proposal is activated, proposals having a particular time as the trigger condition are audited some time prior (e.g., five days before) the trigger condition occurs, etc. In any of these cases, the proposal owner may be notified in any useful way (e.g., via a proposal portal, an email message, etc.) of proposal activation success, proposal activation failure, error flags, remedial suggestions, etc.

FIG. 22 shows a flow diagram of an illustrative method 2200 for handling territory proposals in the context of a multi-dimensional territory, according to various embodiments. For the sake of clarity, the method 2200 is described with reference to various systems described herein, including system 2100 illustrated in FIG. 21. It will be appreciated that embodiments of the method 2200 may be performed on other systems, and the implicated systems may be used to implement other methods. As such, the description of the method 2200 in context of the system 2100 should not be construed as limiting the scope of the invention.

Embodiments of the method 2200 begin at block 2204 by opening a new territory proposal with a name, an owner, and activation conditions based on a territory version. For example, a sales manager or sales administrator opens a territory proposal 804 based on the current production territory version 820. At block 2208, proposed changes to current territory version are sandboxed in the territory proposal. For example, the proposed changes are either modeled as proposed territory definitions against the productions hypercube or as changes that involve a staging environment and a stage territory hypercube.

In some embodiments, proposed territory changes are published to subordinates at block 2212. For example, it may be desirable to share any proposed changes with owners of affected or potentially affected child territories to allow the subordinate to account for any changes prior to their activation. Further, in some embodiments, notification may be received from subordinates that proposed published changes are accounted for at block 2224.

In some embodiments, at block 2216, proposed changes are pre-audited. This may occur at any useful point in the method 2200 prior to activation of the changes. For example, the pre-audit at block 2216 may be implemented in parallel with any publication of the proposed changes (e.g., to subordinates), after notification is received from subordinates at block 2224, etc. As described above, the pre-audit may include gap and/or overlap detection, detection of references to non-existent and/or duplicate nodes, etc.

A determination is made at block 2220 as to whether the proposal passes the pre-audit. If it is determined at block 2220 that the proposal does not pass the pre-audit, the method 2200 may report any errors (e.g., to the owner or to an automated computer system), suggest proposal changes, and/or take any other reporting, suggestive, or remedial actions at block 2222. In some embodiments, the reporting, suggestive, or remedial actions of block 2222 are used in block 2208 to propose further changes. In other embodiments, the reporting, suggestive, or remedial actions of block 2222 are used to automatically generate changes, which may be re-audited (e.g., if necessary or desirable) at block 2216.

If it is determined at block 2220 that the proposal passes the pre-audit, activation of the territory proposal may be requested to occur upon one or more activation conditions. The activation condition(s) may be those set as part of the proposal opening process in block 2204. For example, the proposal owner may set the changes to be promoted to the production environment overnight that night, at the end of the fiscal quarter, when certain metrics values are detected, when certain approval is received, etc.

When the activation condition occurs, the territory proposal may be activated at block 2232. In some embodiments, the proposal may be audited upon activation at block 2236. This audit may be similar to, identical to, more involved than, or less involved than the audit performed at block 2216. In certain embodiments, there is no pre-audit at block 2216, and the audit at block 2236 is the first audit of the proposed changes. Typically, the audit at block 2236 may include checking that boundaries of child territories will not exceed their parents, production territory definitions 722 will not reference invalid territory dimension members 726, any gaps and/or overlaps are only as desired by territory owners, etc.

A determination is made at block 2240 as to whether the proposal passes the audit at block 2236. If it is determined at block 2240 that the proposal does not pass the audit, the method 2200 may take any desired reporting, suggestive, or remedial actions (e.g., by returning to block 2222). In some embodiments, changes may be required, suggested, etc., and re-activation may be requested. In other embodiments, automatically generated changes are re-activated at block 2232, re-audited at block 2236, etc. In some embodiments, proposal audits are done sequentially, for example, in the order that proposals are activated.

If it is determined at block 2240 that the proposal passes the audit, activated changes may be applied in one or more ways. In some embodiments, at block 2244, techniques may be used to determine affected sales territories and perform any realignment. For example, various techniques are described above (e.g., with reference to FIGS. 18-20) for determining territories affected by changes. Further, various techniques are described above (e.g., with reference to FIGS. 15-21) for realignment of territories. These and/or other techniques may be used to apply the proposed changes to the production environment and to determine how the environment is affected.

At block 2248, any affected territories (e.g., or all territories) may be reconciled. For example, the method 2200 may reassign any affected sales accounts and transactions (i.e., opportunities) to appropriate territories after the proposal is activated. As described above, this may involve (e.g., automatically, as a feature of the assignment techniques) reconciliation of any undefined or non-existent territory dimension members 726, any gap or overlap conditions, etc.

It is worth noting that it may be desirable to restore territories to a point in time. For example, within a proposal, it may be necessary or desirable to restore a territory and its descendent territories to a specific point in time, to a specific territory version, to the current production version, etc. Versioning and/or other techniques described above provide territory restoration functionality in some embodiments.

It is further worth noting that proposals may be used to provide different types of functionality. The method 2200 of FIG. 22 describes using territory proposals to sandbox and/or affect changes to territories. Some of these territory changes result from and/or affect portions of the system 800 illustrated in FIG. 8. For example, as described more fully below, proposals may use and/or impact development of a territory model 802 through territory metrics 734, quota models 830, quota setups 840, and resources 850.

For example, in some embodiments, proposals are used to affect one or more metrics, for example, through analytics processing. As described above, metrics data is maintained at cells of the territory hypercube. Territory definitions can be used to query the hypercube to generate territory metrics. These metrics can then be used to generate territory analytics.

In some embodiments, territory analytics help optimize return on sales investment for territories. For example, it may be desirable for all territories to be balanced so that they all have: the same number of existing customers and potentially the same revenue; the same number of potential new customers and potentially the same revenue; the same customer accessibility in terms of travel time and available selling time; the same competitive presence; etc. While it may be impossible to perfectly balance the territories (e.g., to create an ideal market partitioning), an experienced sales manager may be able to use metrics to optimize expected opportunities.

As described above, metrics may be maintained at the cell level in the territory hypercube 450. Territory metrics 734 may then be the aggregation of the metrics of the set of cells that compose the territory 310. Various techniques (e.g., pivoting the territory hypercube 450 according to a selected dimension) provide the ability to analyze various territory 310 configurations by computing various aggregates, depending on the set of cells that comprise a territory 310.

Suppose each cell stores total revenue for the intersection of boundary dimensions that define that cell. For example, referring to the hypercube 450 of FIG. 4, a cell represents hardware products relating to communications for the Northeastern region of the United States (e.g., a cell 410 at the intersection of dimension members 330*a*-1, 330*b*-1, and 330*c*-1). A territory representing all hardware products relating to communications across the United States may effectively be the set of cells 410 of the hypercube 450 at dimension members 330*a*-1 (hardware), 330*c*-1 (communications), and all dimension members of the geography dimension 330*b*. The total revenue for all hardware products relating to communications across the United States may be an aggregation of the metrics from the set of cells defining that territory.

In some embodiments, territory 310 summary level metrics are gathered to represent the judgment of territory owners in the statistical smoothing effect in their territories 310. For example, territory metrics 734 may be used to generate territory level forecast adjustments. Notably, metrics may bring their full significance when they can be compared with other metrics, such as different moments in time, peer territories 310, children territories 310, and proposal versus operational territories 310. In some embodiments, the territory hypercube 450 has a time dimension that provides the ability to analyze metrics over time.

According to various embodiments, metrics may be selected from the following non-exhaustive list: territory quota (e.g., described below); sales account (e.g., number of existing sales accounts at period end date, number of new sales accounts at period end date, number of sales accounts at period end date, etc.); revenue (e.g., average closed revenue size, average sales cycle—revenue items closed, closed detail revenue by close date, existing sales account closed detail revenue by close date, etc.); new sales account closed detail revenue by close date (e.g., number of closed revenue items by close date, number of completed revenue items by close date, number of open revenue items at period end date, number of revenue items completed at period end date, number of revenue items created at period end date, open detail revenue at period end date, open detail revenue by expected closed date, revenue from revenue items completed at period end date, revenue from revenue items created at period end date, total sales cycle—revenue items closed by closed date, number of closed revenue items by actual close date, win rate-revenue items, etc.); forecast (e.g., unadjusted forecast, unadjusted forecast trending, expected forecast, expected forecast trending, best case forecast, best case forecast trending, worst case forecast, worst case forecast trending, etc.); leads (e.g., average market potential per lead by period end date, average follow-up days—converted and retired leads, closed sale to closed lead rate, converted lead to closed lead rate, market potential from leads converted at period end date, market potential from leads created at period end date, market potential from leads retired at period end date, number of converted leads by close date, number of leads converted at period end date, number of leads created at period end date, number of leads retired at period end date, number of open leads at period end date, number of retired leads by close date, open leads market potential at period end date, total leads converted to closed opportunity by close date, total number of days to follow up leads by close date, etc.); qualified leads metrics (e.g., average market potential per qualified lead by period end date, average follow-up days—qualified leads converted and retired, closed lead to closed sale rate for qualified leads, converted to closed rate for qualified leads, market potential from qualified leads at period end date, market potential from qualified leads converted at period end date, market potential from qualified leads retired at period end date, number of open leads qualified at period end date, number of qualified leads converted at period end date, number of qualified leads converted by close date, number of qualified leads retired at period end date, number of qualified leads at period end date, number of qualified leads retired by close date, qualified leads market potential at period end date, total number of days to follow up qualified leads by closed date, total qualified leads converted to closed opportunity by close date, etc.); etc.

As described above, it may be desirable at times to aggregate metrics into territory metrics 734 and/or in other ways. In some embodiments, it may be desirable to use more detailed metrics for analyzing territories 310. For example, the actual accounts available in a territory 310, the past sales to those accounts, the opportunity for new sales to those accounts, competitors already installed in those accounts, etc. may yield desirable information. Further, it will be appreciated that even at the most granular level, territory metrics 734 may essentially be an aggregate of detailed transactions. As such, it may be desirable to drill down into detailed transactions.

As described above, for example, with reference to FIGS. 12-14, embodiments of the multi-dimensional territory models (e.g., the territory hypercube 450) facilitate assignment of opportunities. A further feature of the multi-dimensional territory models is to efficiently and unambiguously assign resources 850 to those opportunities. In some embodiments, these features are corollaries of each other—assignment of an opportunity to a territory 310 is effectively an assignment of that territory's resources 850 to the opportunity. In other embodiments, only some of the resources 850 in a territory 310 are assigned to each opportunity assigned to that territory 310. For example, it may be desirable to assign resources 850 per opportunity to more efficiently balance resource loads (e.g., assuming that all opportunities do not necessarily require the same resource 850 load to be assigned thereto).

Territory 310 assignments may provide unambiguous (e.g., substantially real-time) answers to questions, including the following: as a salesperson, what are my accounts, opportunities, and leads; and which salespersons are assigned to a given account? For example, an assignment manager may be responsible for assigning territories 310 to accounts, leads, and opportunities according to the definition of the territories 310 and the attributes of accounts, leads, and opportunities (e.g., all generally referred to herein as "opportunities" or "work objects"). In some embodiments, the assignment is done automatically whenever a work object is created (e.g., as in FIGS. 12-14) and whenever the boundaries of a territory 310 are modified (e.g., as in FIGS. 15-20).

In some embodiments, territory 310 proposals are used to preview assignment changes before activation of the proposal. For example, the modification of a territory 310 in a territory proposal 804 may change the assignment of sales accounts, leads, and opportunities. Embodiments allow these reassignments to be previewed in the territory proposal 804 before activation. The reassignments may then become effective when the territory proposal 804 is activated (e.g., as described with reference to FIGS. 21 and 22).

As described above, territory proposals can be used to analyze territory metrics 734, to preview assignments, etc. Notably, any changes or proposals may be made according to certain agreed upon objectives for the territories 310. For example, objectives are set for each territory at the beginning of a planning period in the form of a territory quota (e.g., territory quota 822 of FIG. 8). In some embodiments, quotas are determined by a combination of a top-town technique and bottom-up technique.

The top-down technique is a natural cascade of sales objectives down through the territory 310 hierarchy, which may typically be representative of the sales organization. The quota allocation scheme at each territory 310 level, starting at the top, may help ensure alignment with specific objectives of the territory 310, while still relating to the overall business plan.

The bottom-up technique may include market assessments of each territory 310 based on prediction metrics defined in the metrics dimension of the territory hypercube 450. In some embodiments, in addition to a library of available prediction metrics, custom prediction metrics can be designed and tailored according to the needs of an individual territory 310 and/or organization. At each level in the territory 310 hierarchy, techniques may be used to align the quota appropriately between top-down and bottom-up estimates. This may result in variances.

Variances may be spread among the child territories and factored across time using seasonality or other components. The spread technique may compute a relative share among the peer territories based on historic metrics and then spreads the variance according to the peer ratio. Illustrative spread formulas include: equal spread; peer ratio based on closed revenue contribution from prior year; peer ratio based on unadjusted forecast for current/prior year; peer ratio based on potential revenue for current/prior year; peer ratio of past quota; etc.

In some embodiments, the territory hypercube 450 cells that constitute a territory 310 are micromarkets, where the prediction of sales can be made based on historical performance, sales predictions derived from mathematical models, and current perceived market conditions. Examples of prediction metrics include: average variation of revenue over time; comparison of revenue and potential over time; percentage change relative to a specific year additionally qualified by geography, product, or industry; simple moving average of revenue for the last n years; exponential average of revenue for the last n years; weighted average of revenue for the last n years; etc.

It is worth noting that various types of prediction formulae may be used. For example, the prediction metrics for a territory 310 may be expressed as the sum over all territory cells of one or more prediction formulae. In one embodiment, the prediction formulae are expressed in the standard Multidimensional Expression Syntax (MDX) and are available for analysis from a library. For example, an MDX expression fragment of an illustrative prediction formula may look as follows:

WITH MEMBER 'Prediction Metric' as
      '(((([Time].CurrentMember.PrevMember, Bookings)–([Time].CurrentMember.PrevMember.PrevMember, Bookings))/[Time].CurrentMember.PrevMember.PrevMember, Bookings))+
      ((([Time].CurrentMember, Bookings)–([Time].CurrentMember.PrevMember, Bookings))/([Time]. CurrentMember.PrevMember, Bookings)))/2'

In some embodiments, a prediction formula editor is provided. While a library of prediction metrics could cater to many business scenarios, an advanced user or business scenario may warrant a customization of prediction metrics. The prediction formula editor may provide a mechanism for an advanced user to create, modify, validate and apply a prediction formula to a territory 310.

The prediction formula may be constructed as an MDX expression fragment using MDX functions, outline items (dimensions, members, measures) and parameter variables. The MDX expression fragment is transparently combined with the territory definition to obtain prediction results from the hypercube. To assist with the creation of the prediction formula, the outline viewer component allows advanced users to pick outline items. The editor also offers a categorized selection of MDX functions. Finally, the user can manually edit any changes to the prediction formula in the editor text area, validate it, and apply any results to the associated territory.

Embodiments exploit some or all of the territory proposal functionality described above for use in what-if analysis. For example, as described above, modeling sales territories using a multidimensional model may allow analytics data (e.g., territory metrics 734) to be represented as another dimension in the same territory hypercube 450 (e.g., each metric to be used for the analysis of territory realignment is loaded into the territory hypercube 450 as a member of the metrics dimension). The analytics data can then be sourced from the data warehouse and loaded into the territory hypercube 450 (e.g., as described with reference to FIG. 7).

Notably, since sales territories are represented as a set of cells in the territory hypercube 450, any metrics that are loaded into the same territory hypercube 450 can be quickly accessed for any given territory definition (e.g., using an MDX query). This may provide certain features. One such feature is that as sales managers and executives model changes the territory definitions in their model, they may get near real-time feedback of key analytical information that may allow them to assess the impact of the change. This can produce a significant time-saving in the overall implementation of territory realignments relative to prior solutions.

Another such feature is that, since both sales territories 310 and metrics are represented in the same territory hypercube 450 as a set of cells, the analytics information can be accessed very quickly. Irrespective of the amount of historical data, the metrics are effectively pre-aggregated when the territory hypercube 450 is loaded, such that querying the metrics (e.g., using an MDX query) is efficient and fast. This may yield a performance improvement over traditional approaches that use data warehouse designs to provide analytical information.

Still another such feature is that, since both sales territories and key metrics are represented in the same territory hypercube 450 as a set of cells, realignment of sales territories 310 may be modeled to provide the corresponding analytical capabilities all within one environment (e.g., a single application). For example, users do not have to perform territory modeling in one application, and then access analytical information in other disintegrated analytical applications.

FIG. 23 shows a flow diagram of an illustrative method 2300 for implementing what-if analyses in the context of a multi-dimensional territory, according to various embodiments. For the sake of clarity, the method 2300 is described with reference to various systems described herein, including system 2100 illustrated in FIG. 21. It will be appreciated that embodiments of the method 2300 may be performed on other systems, and the implicated systems may be used to implement other methods. As such, the description of the method 2300 in context of the system 2100 should not be construed as limiting the scope of the invention.

Embodiments of the method 2300 begin at block 2304 by opening a what-if analysis. The what-if analysis may be opened as part of a territory proposal process (e.g., as in FIG. 22), or at any other useful time. A goal of the what-if analysis may be to exploit some or all of the territory proposal functionality described above (e.g., metrics analytics, resource assignments, quotas, load balancing, etc.) to predict effects of changes to territories 310, assignments, etc. For example, embodiments allow the what-if analysis to use substantially real-time production territory definitions (e.g., and/or work objects, etc.) and obtain substantially real-time, unambiguous answers without affecting the production environment.

For the sake of illustration and added context, certain blocks of the method 2200 of FIG. 22 are shown as dashed boxes. For example, the what-if analysis may include making certain changes and predicting what effect those changes will have on analytics, etc. At block 2208a, the changes are sandboxed against a territory version. In certain embodiments, the sandboxing is performed substantially as described above with reference to block 2208 of FIG. 22. Further, as in FIG. 22, the changes may be audited at block 2216a, if desired. If the audit is determined not to be passed at block 2220a, more or different changes may be made. If the changes are determined to pass the audit at block 2220a, the method 2300 may proceed.

At block 2308, an analytics query may be generated. Notably, the analytics query may be generated regardless of what type of, if any, changes are made to the territories 310, work objects, etc. For example, it may be desirable to run what-if analyses even on unchanged territory 310 data (e.g., by skipping blocks 2208a, 2216a, and 2220a). In some embodiments, the analytics query is generated by a user or an automated system, and is passed to the query processing module 2135 of FIG. 21 for processing. The analytics query may be a prediction formula (e.g., an MDX query, as described above), a query provided through a dedicated or standard GUI, etc.

At block 2312, the analytics query may be executed against the metrics in the cells of the territory hypercube 450. As described above, many types of metrics may be used to generate many types of analytics by aggregation, parsing, filtering, comparing, calculating, etc. The results of the analytics query may be output at block 2316. For example, the analytics query results may be output as raw data, in a report format, and/or in any useful form to any useful device or system.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:
  generating a set of proposed territory definitions in a territory management system, the set of proposed territory definitions representing a hierarchical set of proposed territories each as a set of cells of a hypercube, the hypercube defined according to a set of territory dimensions each having a set of dimension members, such that each cell represents an intersection of dimension members from each territory dimension, and at least some of the cells store metrics data corresponding to its intersection of the dimension members from each territory dimension;

receiving a modification to the proposed territory definitions at the territory management system via a user interface;

updating the proposed territory definitions in the territory management system according to the modification;

receiving a query at the territory management system via a user interface, wherein receiving the query comprises receiving an opportunity defined by opportunity data;

executing the query against the proposed territory definitions in the territory management system to generate a query result, wherein executing the query against the proposed territory definitions in the territory management system to generate the query result comprises:

generating an opportunity definition by transforming the opportunity data to corresponding dimension members of the hypercube, determining a matching territory from the hierarchical set of proposed territories for assignment of the opportunity according to matching the proposed territory definition of the matching territory with the opportunity definition, and outputting the query result from the territory management system via the user interface comprises generating an assignment preview of the opportunity to the matching territory;

determining a matching territory from the hierarchical set of proposed territories for assignment of the opportunity according to matching the proposed territory definition of the matching territory with the opportunity definition comprises:

generating a set of de-normalized territory definitions by de-normalizing at least some of the proposed territory definitions according to their corresponding territory dimensions and dimension members, and determining the matching territory by identifying one of the hierarchical set of proposed territories for which the dimension members of its de-normalized territory definition at least encompass the dimension members corresponding to the opportunity definition; and outputting the query result from the territory management system via the user interface.

2. The method of claim 1, wherein:
the hypercube is a production hypercube maintained in a production environment of the territory management system; and
updating the proposed territory definitions in the territory management system according to the modification is performed without affecting the production hypercube.

3. The method of claim 1, wherein:
the hypercube is a stage hypercube maintained in a staging environment of the territory management system; and
updating the proposed territory definitions in the territory management system according to the modification comprises reconstructing the stage hypercube at least according to the modification.

4. The method of claim 1, wherein executing the query against the proposed territory definitions in the territory management system to generate the query result comprises:
identifying a queried territory and a queried metric according to the query;
identifying a queried set of cells of the hypercube corresponding to the queried territory;
generating an aggregation of at least some of the metrics data from the queried set of cells according to the queried metric, the query result relating to the aggregation.

5. The method of claim 4, wherein executing the query against the proposed territory definitions in the territory management system to generate the query result further comprises
calculating a trend analysis according to the aggregation and temporal data, the metrics data from the queried set of cells comprising the temporal data.

6. The method of claim 1, wherein:
the set of proposed territory definitions is expressed according to an Online Analytical Processing (OLAP) business intelligence framework.

7. A system comprising:
one or more processors; and
a user interface subsystem, configured to:
receive a modification to a set of proposed territory definitions at a territory management system, the set of proposed territory definitions representing a hierarchical set of proposed territories each as a set of cells of a hypercube, the hypercube defined according to a set of territory dimensions each having a set of dimension members, such that each cell represents an intersection of dimension members from each territory dimension, and at least some of the cells store metrics data corresponding to its intersection of the dimension members from each territory dimension; and
receive a query, wherein the query identifies an opportunity defined by opportunity data;
an analysis subsystem, communicatively coupled with the user interface subsystem, and configured to:
update the proposed territory definitions according to the modification;
execute the query against the proposed territory definitions to generate the query result by:
generating an opportunity definition by transforming the opportunity data to corresponding dimension members of the hypercube; and
determining a matching territory from the hierarchical set of proposed territories for assignment of the opportunity according to matching the proposed territory definition of the matching territory with the opportunity definition;
execute the query against the proposed territory definitions to generate a query result, wherein determining a matching territory from the hierarchical set of proposed territories for assignment of the opportunity according to matching the proposed territory definition of the matching territory with the opportunity definition comprises:
generating a set of de-normalized territory definitions by de-normalizing at least some of the proposed territory definitions according to their corresponding territory dimensions and dimension members; and
determining the matching territory by identifying one of the hierarchical set of proposed territories for which the dimension members of its de-normalized territory definition at least encompass the dimension members corresponding to the opportunity definition; and
output the query result, via the user interface subsystem, by generating an assignment preview of the opportunity to the matching territory.

8. The system of claim 7, wherein the analysis subsystem is configured to execute the query against the proposed territory definitions to generate the query result by:

identifying a queried territory and a queried metric according to the query;

identifying a queried set of cells of the hypercube corresponding to the queried territory; and generating an aggregation of at least some of the metrics data from the queried set of cells according to the queried metric, the query result relating to the aggregation.

9. The system of claim 8, wherein the analysis subsystem is configured to execute the query against the proposed territory definitions to generate the query result further by:

calculating a trend analysis according to the aggregation and temporal data, the metrics data from the queried set of cells comprising the temporal data.

10. A non-transitory machine-readable medium having stored thereon a series of instructions which, when executed by a processor in a territory management system, cause the processor to perform steps comprising:

generating a set of proposed territory definitions in a territory management system, the set of proposed territory definitions representing a hierarchical set of proposed territories each as a set of cells of a hypercube, the hypercube defined according to a set of territory dimensions each having a set of dimension members, such that each cell represents an intersection of dimension members from each territory dimension, and at least some of the cells store metrics data corresponding to its intersection of the dimension members from each territory dimension;

receiving a modification to the proposed territory definitions at the territory management system via a user interface;

updating the proposed territory definitions in the territory management system according to the modification;

receiving a query at the territory management system via a user interface, wherein receiving the query comprises receiving an opportunity defined by opportunity data;

executing the query against the proposed territory definitions in the territory management system to generate a query result, wherein executing the query against the proposed territory definitions in the territory management system to generate the query result comprises:

generating an opportunity definition by transforming the opportunity data to corresponding dimension members of the hypercube, determining a matching territory from the hierarchical set of proposed territories for assignment of the opportunity according to matching the proposed territory definition of the matching territory with the opportunity definition, and outputting the query result from the territory management system via the user interface comprises generating an assignment preview of the opportunity to the matching territory;

determining a matching territory from the hierarchical set of proposed territories for assignment of the opportunity according to matching the proposed territory definition of the matching territory with the opportunity definition comprises:

generating a set of de-normalized territory definitions by de-normalizing at least some of the proposed territory definitions according to their corresponding territory dimensions and dimension members, and determining the matching territory by identifying one of the hierarchical set of proposed territories for which the dimension members of its de-normalized territory definition at least encompass the dimension members corresponding to the opportunity definition; and outputting the query result from the territory management system via the user interface.

11. The non-transitory machine-readable medium of claim 10, wherein:

the hypercube is a production hypercube maintained in a production environment of the territory management system; and updating the proposed territory definitions in the territory management system according to the modification is performed without affecting the production hypercube.

12. The non-transitory machine-readable medium of claim 10, wherein:

the hypercube is a stage hypercube maintained in a staging environment of the territory management system; and updating the proposed territory definitions in the territory management system according to the modification comprises reconstructing the stage hypercube at least according to the modification.

13. The non-transitory machine-readable medium of claim 10, wherein executing the query against the proposed territory definitions in the territory management system to generate the query result comprises:

identifying a queried territory and a queried metric according to the query;

identifying a queried set of cells of the hypercube corresponding to the queried territory;

generating an aggregation of at least some of the metrics data from the queried set of cells according to the queried metric, the query result relating to the aggregation.

14. The non-transitory machine-readable medium of claim 13, wherein executing the query against the proposed territory definitions in the territory management system to generate the query result further comprises calculating a trend analysis according to the aggregation and temporal data, the metrics data from the queried set of cells comprising the temporal data.

* * * * *

UNITED STATES PATENT AND TRADEMARK OFFICE
CERTIFICATE OF CORRECTION

PATENT NO. : 8,510,659 B2
APPLICATION NO. : 12/857410
DATED : August 13, 2013
INVENTOR(S) : Lam et al.

It is certified that error appears in the above-identified patent and that said Letters Patent is hereby corrected as shown below:

In the Specification

In column 9, line 52, delete "and or" and insert -- and/or --, therefor.

In column 19, line 22, delete ""Sacremento"" and insert -- "Sacramento" --, therefor.

In column 22, line 29, delete ""Sacremento"" and insert -- "Sacramento" --, therefor.

In column 25, line 43, delete "ay" and insert -- any --, therefor.

Signed and Sealed this
Twelfth Day of November, 2013

Teresa Stanek Rea
*Deputy Director of the United States Patent and Trademark Office*